US010181107B2

(12) United States Patent
Gopinath et al.

(10) Patent No.: US 10,181,107 B2
(45) Date of Patent: Jan. 15, 2019

(54) USING CONSUMPTION DATA AND AN INVENTORY MODEL TO GENERATE A REPLENISHMENT PLAN

(71) Applicant: Oracle International Corporation, Redwood Shores, CA (US)

(72) Inventors: Nithin Gopinath, Alpharetta, GA (US); Kiran Saindane, Dublin, CA (US); Nadav Zivelin, Menlo Park, CA (US); Bart Feldman, Lexington, MA (US); Michael Liebson, Cambridge, MA (US); Vikash Goyal, Newark, CA (US); Nagappan Periakaruppan, Burlington, MA (US); Eytan E. Arkin, Chestnut Hill, MA (US)

(73) Assignee: Oracle International Corporation, Redwood Shores, CA (US)

( * ) Notice: Subject to any disclaimer, the term of this patent is extended or adjusted under 35 U.S.C. 154(b) by 749 days.

(21) Appl. No.: 14/314,442

(22) Filed: Jun. 25, 2014

(65) Prior Publication Data

US 2015/0379449 A1 Dec. 31, 2015

(51) Int. Cl.
*G06Q 10/00* (2012.01)
*G06Q 10/06* (2012.01)
*G06Q 10/08* (2012.01)

(52) U.S. Cl.
CPC ..... *G06Q 10/06315* (2013.01); *G06Q 10/087* (2013.01)

(58) Field of Classification Search
CPC ............. G06Q 10/087; G06Q 30/0202; G06Q 30/0205

(Continued)

(56) References Cited

U.S. PATENT DOCUMENTS 5,963,919 A * 10/1999 Brinkley ............. G06Q 10/087
705/22
6,061,660 A 5/2000 Eggleston
(Continued)

OTHER PUBLICATIONS

Non-final Office Action dated Mar. 29, 2016 for related U.S. Appl. No. 14/213,500.

(Continued)

*Primary Examiner* — Luna Champagne
(74) *Attorney, Agent, or Firm* — Vista IP Law Group, LLP

(57) ABSTRACT

A method, system, and computer program product for generating forecasts and replenishment plans. Some embodiments commence upon receiving point-of-sale data, then receiving distribution-level order data in a second data format. The first point-of-sale data comprises an item identifier and a first date or first date range, and the distribution-level order data comprises the item identifier and a second date or second date range. The originators of the order data are determined using address identifiers (e.g., network location identifiers). The received data is combined wherein at least a portion of the point-of-sale data is combined with at least a portion of the distribution-level order data to generate a combined forecast for the item. Further processing includes receiving an inventory model parameter and combining at least a portion of the first point-of-sale consumption data with at least a portion of the distribution-level order data to generate a replenishment plan for the item.

20 Claims, 16 Drawing Sheets

(58) Field of Classification Search
USPC ............................................ 705/7.31, 7.38, 7.34
See application file for complete search history.

(56) References Cited

U.S. PATENT DOCUMENTS

| | | | |
|---|---|---|---|
| 7,249,033 | B1 | 7/2007 | Close |
| 7,660,734 | B1 | 2/2010 | Neal |
| 7,664,683 | B2 | 2/2010 | Feldman et al. |
| 7,711,612 | B1 | 5/2010 | Farias |
| 7,979,299 | B1 | 7/2011 | Mehta |
| 8,214,238 | B1 | 7/2012 | Fairfield |
| 8,266,066 | B1 | 9/2012 | Wezter |
| 9,098,315 | B1 * | 8/2015 | Kapoor ................ G06F 9/541 |
| 2002/0013786 | A1 | 1/2002 | Machalek |
| 2002/0138336 | A1 | 9/2002 | Bakes |
| 2002/0165834 | A1 | 11/2002 | Delurgio |
| 2003/0009386 | A1 * | 1/2003 | Menninger ......... G06Q 10/06 705/7.36 |
| 2003/0033180 | A1 | 2/2003 | Shekar |
| 2003/0126103 | A1 * | 7/2003 | Chen ................... G06Q 10/06 706/50 |
| 2004/0193439 | A1 | 9/2004 | Marrott |
| 2004/0267676 | A1 | 12/2004 | Feng |
| 2005/0096963 | A1 | 5/2005 | Myr |
| 2008/0077459 | A1 | 3/2008 | Desai |
| 2008/0126171 | A1 | 5/2008 | Baldwin |
| 2010/0125486 | A1 | 5/2010 | Sinclair |
| 2010/0169167 | A1 | 7/2010 | Feldman et al. |
| 2011/0131162 | A1 | 6/2011 | Kaushal |
| 2011/0173680 | A1 | 7/2011 | Bates |
| 2012/0173300 | A1 | 7/2012 | Davenport |
| 2013/0297556 | A1 * | 11/2013 | Chen ................... G06F 17/30 707/602 |
| 2014/0095295 | A1 | 4/2014 | Feldman et al. |
| 2014/0278713 | A1 | 9/2014 | Zivelin et al. |

OTHER PUBLICATIONS

Final Office Action dated Jun. 2, 2016 for related U.S. Appl. No. 14/213,516.
Final Office Action dated Sep. 1, 2016 for related U.S. Appl. No. 14/213,500.
Final Office Action dated Sep. 9, 2016 for related U.S. Appl. No. 14/039,591.
JDA, The Supply Chain Company, "JDA Advanced Store Replenishment", Aug. 26, 2010, 2 pages.
JDA, Collaborative Category Management, "JDA Flowcasting", Mar. 24, 2014, 3 pages.
Alicia Fiorletta, "Kraft Taps JDA Flowcasting to Maximize Retailer-Supplier Collaboration", Jul. 26, 2013, 8 pages.
Voluntary Interindustry Commerce Solutions (VICS), CPFR, "The Ultimate Retail Supply Chain Machine: Connecting the Consumer to the Factory", Version 1.1, Jan. 2013.
Myers, Tom, et al., "Oracle® Advanced Supply Chain Planning—Implementation and User's Guide" Release 12.1, dated Nov. 2010 (1,566 pages).
Westgate, Diane, et al., "Oracle® Demantra—Implementation Guide" Release 7.3, dated Nov. 2010 (1,442 pages).
Non-final Office Action dated Nov. 17, 2015 for related U.S. Appl. No. 14/213,516.
Non-final Office Action dated Jan. 12, 2016 for related U.S. Appl. No. 14/039,591.
Non-final Office Action dated Dec. 30, 2016 for related U.S. Appl. No. 14/213,516.
Non-final Office Action dated Jan. 11, 2017 for related U.S. Appl. No. 14/213,500.
Non-final Office Action dated Feb. 15, 2017 for related U.S. Appl. No. 14/039,591.
Non-final Office Action dated Feb. 28, 2017 for related U.S. Appl. No. 14/314,373.
Final Office Action dated Jun. 12, 2017 for related U.S. Appl. No. 14/213,500.
Final Office Action dated Jun. 22, 2017 for related U.S. Appl. No. 14/039,591.
Final Office Action dated Aug. 10, 2017 for related U.S. Appl. No. 14/213,516.
Final Office Action dated Aug. 10, 2017 for related U.S. Appl. No. 14/314,373.
Notice of Allowance and Fee(s) Due dated Jan. 31, 2018 for related U.S. Appl. No. 14/314,373.

\* cited by examiner

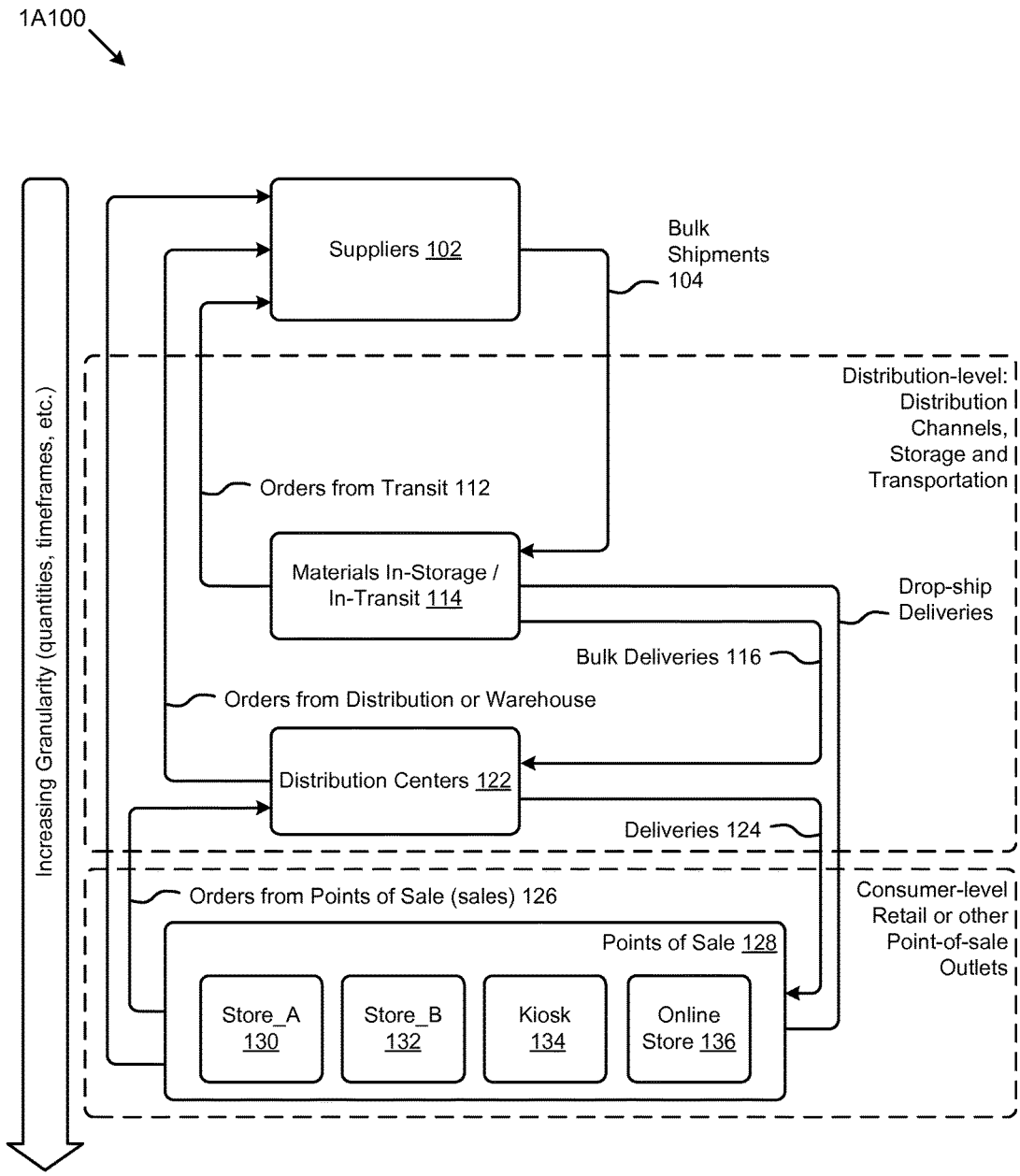
FIG. 1A1

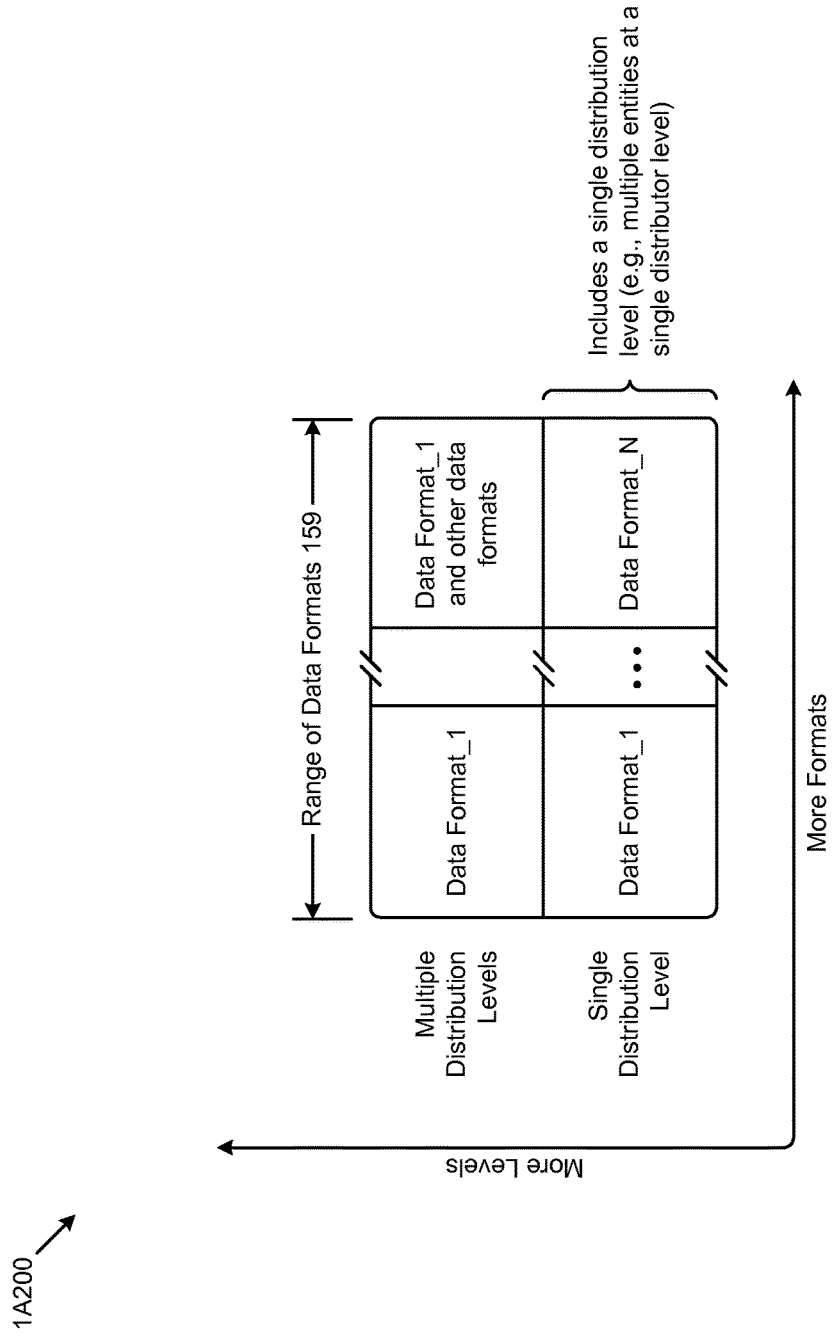
FIG. 1A2

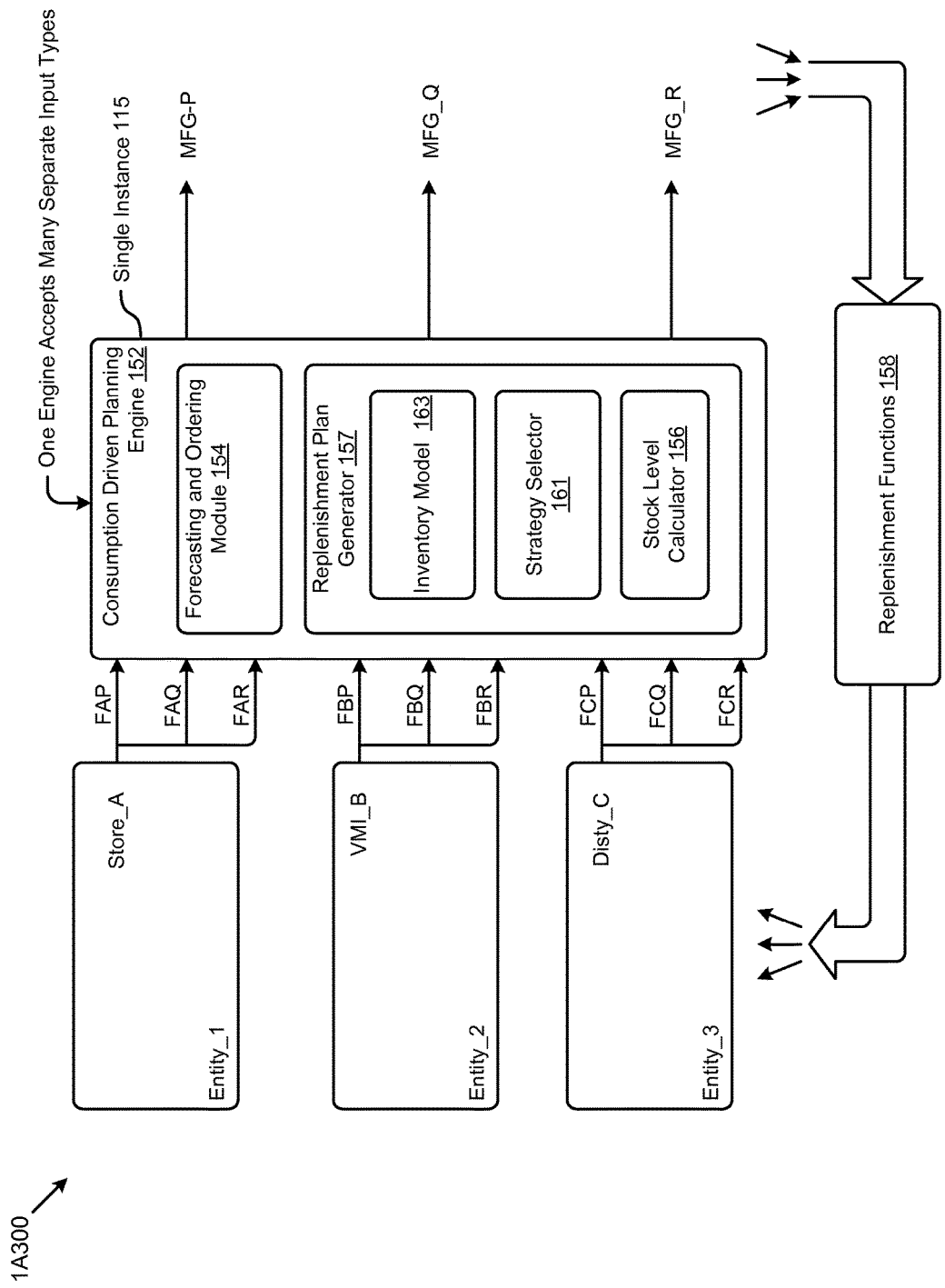
FIG. 1A3

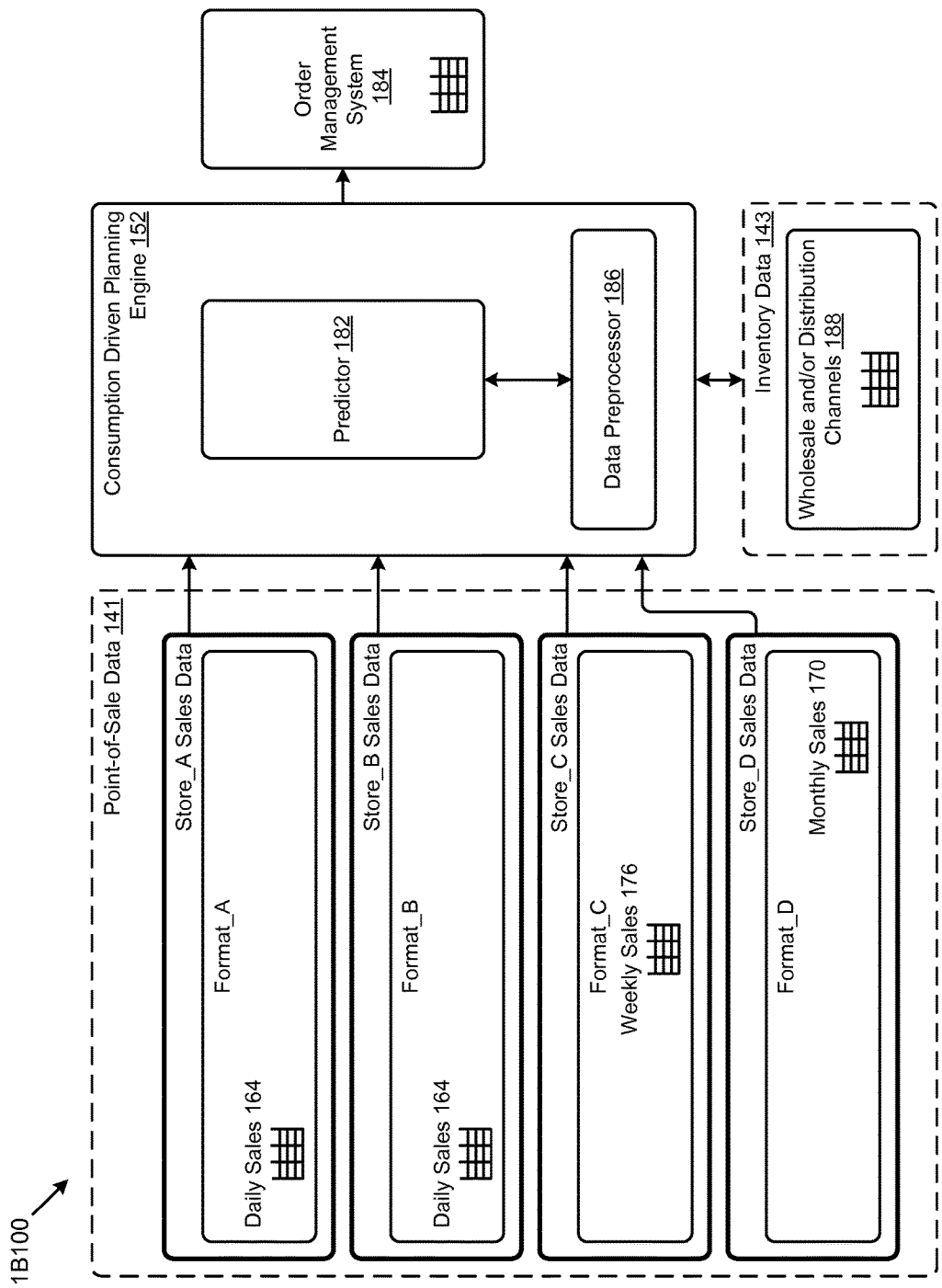
FIG. 1B1

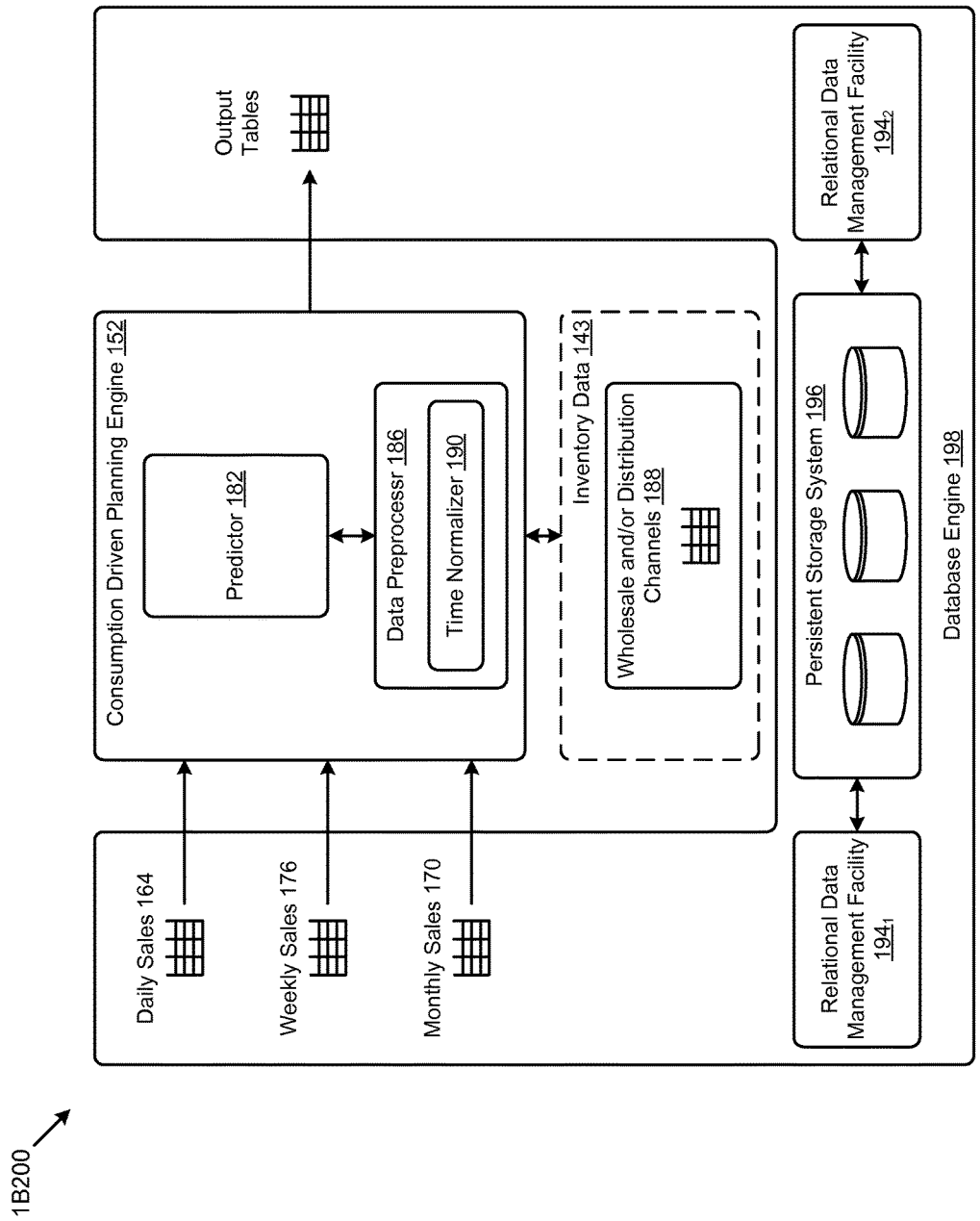
FIG. 1B2

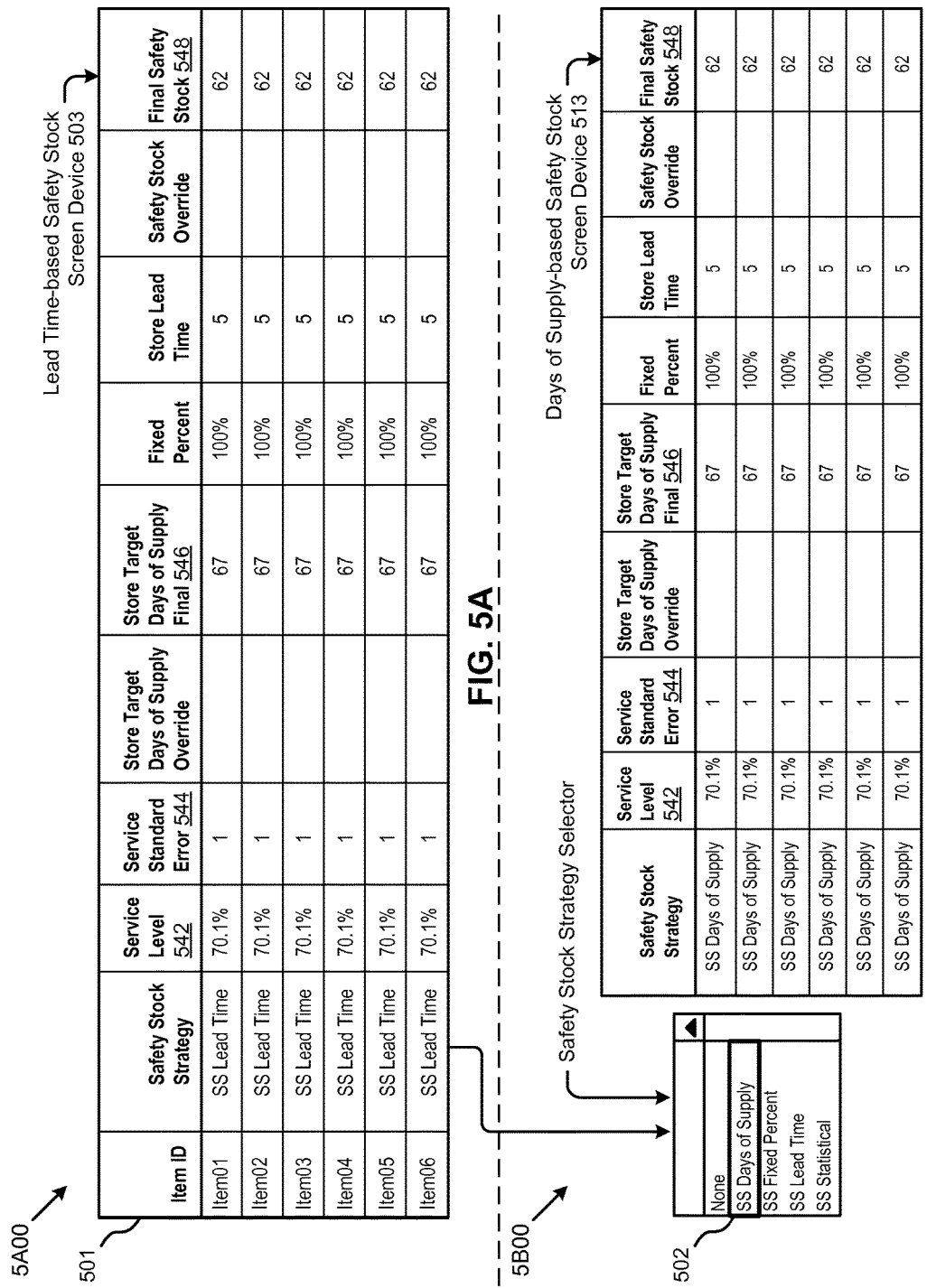

USING CONSUMPTION DATA AND AN INVENTORY MODEL TO GENERATE A REPLENISHMENT PLAN

RELATED APPLICATIONS

The present application is related to co-pending U.S. patent application Ser. No. 14/314,373, entitled "CONSUMPTION-DRIVEN FORECASTING USING MULTI-LEVEL HETEROGENEOUS INPUT DATA", filed on even date herewith, and which is hereby incorporated by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The disclosure relates to the field of forecasting, stocking and replenishment systems and more particularly to techniques for generating accurate replenishment plans.

BACKGROUND

In many commercial settings, the distribution of goods from a manufacturer or supplier through distribution tiers and out to a store, kiosk or other point of sale is accomplished in accordance with a plan (e.g., a replenishment plan). A replenishment plan often specifies quantities of particular goods to be delivered to particular destinations at particular moments in time. Some replenishment plans are executed on a periodic basis and may include movement of goods or other forms of distribution to a point-of-sale (e.g., a checkout line or a barcode scanner). Often such distribution involves transportation through one or more transportation networks, and/or to or through consolidation and/or distribution centers and other storage of goods in warehousing facilities and/or on shelves (e.g., in a store or kiosk vendor situation). Often, point-of-sale vendors rely on their suppliers or distributors to replenish product stock in enough quantity (and in time) so as to have enough available (e.g., on the shelf) supply to satisfy any predictable demand. In other situations, the store places orders to the supplier. Even in this latter case, suppliers still need to know about the order demand so they can deploy enough inventory to fulfill store orders. Unfortunately, when the point-of-sale operator (e.g., store or kiosk or retail outlet operator) relies on the suppliers or distributors to place orders on behalf of the point-of-sale operator, this sets up conditions such that orders delivered to the point-of-sale can be far too large (or small) and/or are far too early (or late). Indeed, some naïve approaches to ensure sufficient point-of-sale stock have included purposely over-ordering to amass shelf stock or stockroom stock, "just in case". However, although excess stock can mitigate the potential for lost sales during periods of higher demand, amassing the excess stock may be expensive (e.g., in the case of higher dollar value goods) or may be impractical (e.g., in the case of perishables). Moreover, merely ordering more (or fewer) quantities on behalf of point-of-sale operators and or placing orders earlier (or later) in time only serves to accelerate or delay the ordering errors. What is needed is a technique or techniques to combine point-of-sale consumption data, with distribution channel orders and inventory replenishment rules or models to generate a replenishment plan. The aforementioned legacy systems fail to reconcile retail-level consumption data (e.g., point-of-sale data) with wholesale or other distribution channel data (e.g., wholesaler's orders, inventory levels, etc.).

None of the aforementioned legacy approaches achieve the capabilities of the herein-disclosed techniques for using point-of-sale consumption data in combination with distribution channel orders and an inventory replenishment model to generate a replenishment plan. Therefore, there is a need for improvements.

SUMMARY

The present disclosure provides an improved method, system, and computer program product suited to address the aforementioned issues with legacy approaches. More specifically, the present disclosure provides a detailed description of techniques used in methods, systems, and computer program products for dynamic time-phased consumption-driven forecasting and replenishment planning.

Some embodiments commence upon receiving point-of-sale data, then receiving distribution-level order data. The first point-of-sale data comprises an item identifier and a first date or first date range, and the distribution-level order data comprises the item identifier and a second date or second date range. The originators of the order data are determined using address identifiers (e.g., network location identifiers). The received data is combined wherein at least a portion of the point-of-sale data is combined with at least a portion of the distribution-level order data to generate a combined forecast for the item. Further processing includes receiving an inventory model parameter and combining at least a portion of the first point-of-sale consumption data with at least a portion of the distribution-level order data to generate a replenishment plan for the item.

Further details of aspects, objectives, and advantages of the disclosure are described below and in the detailed description, drawings, and claims. Both the foregoing general description of the background and the following detailed description are exemplary and explanatory, and are not intended to be limiting as to the scope of the claims.

BRIEF DESCRIPTION OF THE DRAWINGS

FIG. 1A1 depicts an environment showing increasing granularity of ordering from a supplier through distribution channels to multiple points of sale.

FIG. 1A2 is a chart showing characteristics of multi-level, multi-format data exchanges as used in systems for dynamic time-phased consumption-driven forecasting and replenishment planning, according to some embodiments.

FIG. 1A3 is a multi-level, multi-format example of a planning engine as used in systems for dynamic time-phased consumption-driven forecasting and replenishment planning, according to some embodiments.

FIG. 1B1 depicts a planning scenario that combines point-of-sale data and inventory data as used in systems for dynamic time-phased consumption-driven forecasting and replenishment planning, according to some embodiments.

FIG. 1B2 is a system for combining point-of-sale data and inventory data as used to implement dynamic time-phased consumption-driven forecasting and replenishment planning, according to some embodiments.

FIG. 5A is a user interface showing characteristics of a lead-time safety stock replenishment strategy as used in dynamic time-phased consumption-driven forecasting and replenishment planning, according to some embodiments.

FIG. 5B is a user interface showing characteristics of a supply-oriented safety stock replenishment strategy as used in dynamic time-phased consumption-driven forecasting and replenishment planning, according to some embodiments.

DETAILED DESCRIPTION

Figure 2A:
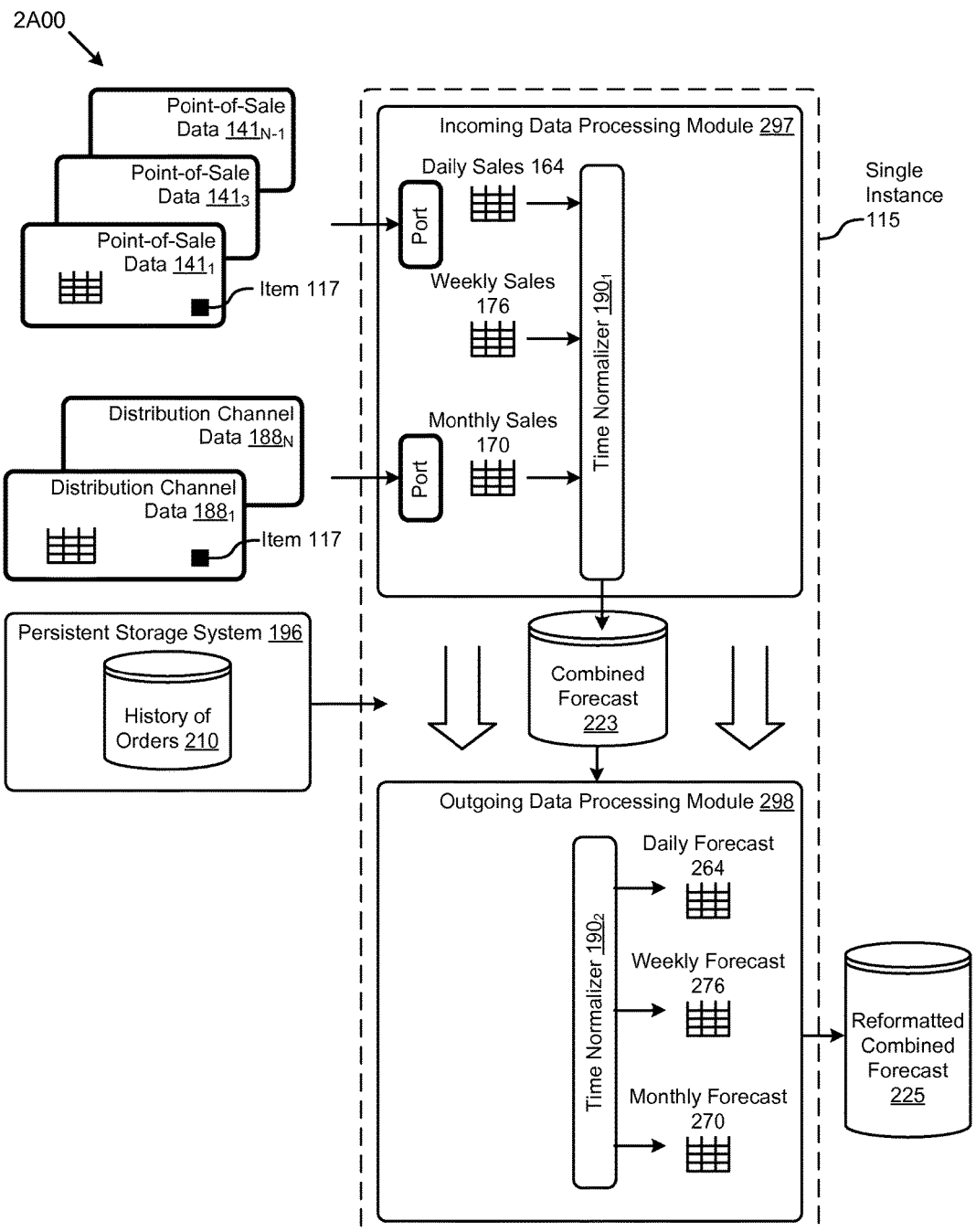
FIG. 2A depicts a data flow for combining multi-level heterogeneous ordering data as used in systems for dynamic time-phased consumption-driven forecasting planning, according to some embodiments.

Disclosed herein and in the accompanying figures are exemplary environments, methods, and systems for dynamic time-phased consumption-driven forecasting and replenishment planning.

Overview

Sales and order data from point-of-sale locations and from other points in a supply-to-consumer channel can vary with successively more volatility as time goes on, and suppliers and manufacturers may be impacted from such volatility. A 'bullwhip' effect tends to create overages in inventory followed by shortages in inventory. One approach to ameliorate the bullwhip effect is to account for point-of-sale data when producing demand forecasts provided to upstream distribution and warehousing entities. Accounting for point-of-sale data when rolling up forecasts for suppliers serves to reduce bullwhip effect volatility in orders (e.g., overstatements). Further, accounting for point-of-sale data when rolling up forecasts for suppliers serves to reduce the cycle of inventory build-up followed by shortages at various points in the distribution tiers.

Suppliers need accurate forecasting of demand in order to plan for future deliveries—so as to keep the items in stock for immediate "off the shelf" purchase or "fast delivery" to satisfy consumer demands. Such processing of forecast errors can have fairly long range consequences, for example when the supplier significantly over-orders raw materials. Suppliers want forecasts that exhibit a high degree of fidelity to the actual materials and/or product movement (e.g., accurate roll-up forecasts), and point-of-sale operators want deliveries that exhibit a high degree of fidelity to the timing and quantity of units that the point-of-sale operators will need to satisfy demand. Issues of volatility can be solved by combining point-of-sale demand data with distribution tier demand data. Embodiments of the present disclosure include methods and systems that serve to:

Generate orders for suppliers that combine orders from point-of-sale operators (e.g., retail outlets), with orders from other operators or carriers in the distribution channel (e.g., from wholesalers or from distributor's, or from distribution centers, etc.) so as to generate forecasts that dampen out or eliminate the bullwhip effect.

Maintain a repository of inventory model parameters (e.g., goal parameters), including service-level quantification that can be used when forming a replenishment plan, Deploy a computer-implemented engine that can calculate a detailed and accurate (e.g., accurate in terms of timing and accurate in terms of order size) replenishment plan based on combinations of received point-of-sale consumption data, distribution tier orders, and inventory models.

Definitions

Some of the terms used in this description are defined below for easy reference. The presented terms and their respective definitions are not rigidly restricted to these definitions—a term may be further defined by the term's use within this disclosure.

The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances.

The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

Descriptions of Exemplary Embodiments

FIG. 1A1 depicts an environment showing increasing granularity of ordering from a supplier through distribution channels to multiple points of sale. As an option, one or more instances of environment 1A100 or any aspect thereof may be implemented in the context of the architecture and functionality of the embodiments described herein. Also, the environment 1A100 or any aspect thereof may be implemented in any desired environment.

As shown in FIG. 1A1, quantities (e.g., quantities of products) move from suppliers (e.g., suppliers 102) to various points of sale 128. The movement of products may come in the form of bulk shipments 104, which shipments may be stored in an intermediate staging and/or storage facility (e.g., see the materials in-storage facility and/or in-transit facility 114).

Continuing with the discussion of this FIG. 1A1, quantities that are stored and/or are in transit may become bulk deliveries 116, which can be delivered to distribution centers 122. The distribution centers 122 serve as a repository for quantities which become deliveries 124, which in turn are to be delivered to various points of sale 128. The shown points of sale may include brick-and-mortar stores, kiosks or online stores. For example stores may include store_A 130, store_B 132, a kiosk 134, and or a holding facility for an online store 136. In some cases quantities are delivered directly from a state of being in-transit directly to points of sale 128 (e.g., without being stored at a distribution center).

When a store or kiosk is in need of additional quantities (e.g., to replenish stock), the store or kiosk might place an order (e.g., orders from points of sale 126) to a supplier. However in some cases, a point-of-sale demand for additional quantities may be serviced by a distribution center (e.g., distribution centers 122). In such a case, the distribution center may place an order to a supplier. Certain other cases exist where an order is placed to a supplier. As shown, an agent for materials in storage and or an agent handling materials that are in-transit may place orders (e.g., orders from transit 112) to the supplier to cover quantities damaged in storage or transit. Another case covers the situation where an agent or sub-manufacturer dealing with partially complete materials may place orders to a supplier (e.g., to cover defective materials).

As can be seen, suppliers 102 receives orders at multiple times, and from multiple agents or entities. As such, those supplier needs a technique where orders can arrive from points of sale, distribution facilities or warehouses, materials and storage facilities and/or from in-transit facilities, or even from sub-manufacturer's, and yet the supplier is able to receive or reconcile and process these orders, even though the orders are raised by many different agents or entities in the ecosystem. In addition to the foregoing complexity, orders raised from one agent or entity might refer to quantities differently than orders raised from another agent or entity. For example, orders from points of sale 126 might refer to quantities in relatively small units (e.g., individual units, or individual small packets), whereas orders raised from a distribution center might refer to quantities in relatively larger units (e.g., pallets or cartons). Similarly, the time frames referring to the need for orders to be fulfilled might vary substantially, depending on the nature of the agent or entity. Strictly as one example, a point-of-sale agent or entity might raise orders based on a forecast through an upcoming month. Or, a distribution center agent or entity might raise orders based on a forecast through an upcoming quarter, or even longer period of time. As shown, the granularity of quantities and time frames increases through the progression from supplier to points of sale.

As time progresses, additional agents or entities may enter into the ecosystem. In some cases an additional agent or entity creates yet an additional level of distribution. Any addition of an agent or entity and/or any addition of a level of distribution between supplier and points of sale may introduce the potential for additional data formats, according to which data formats orders are placed. As such orders may be delivered to suppliers in accordance with a range of data formats, which range of data formats and correspondence to distribution levels are presently discussed.

FIG. 1A2 is a chart 1A200 showing characteristics of multi-level, multi-format data exchanges as used in systems for dynamic time-phased consumption-driven forecasting and replenishment planning. As an option, one or more instances of chart 1A200 or any aspect thereof may be implemented in the context of the architecture and functionality of the embodiments described herein. Also, the chart 1A200 or any aspect thereof may be implemented in any desired environment.

FIG. 1A2 depicts the situation where multiple levels of distribution raise orders to suppliers using various formats of order data. As the number of agents and entities increases, so does the range of data formats 159. Further the range of data formats may vary across a single distribution level, or the range of data formats 159 may be different (or be common) from one distribution level into a second distribution level.

One approach to handling such a wide range of data formats, possibly encompassing multiple levels of distribution, is to rely on the suppliers to reconcile order data even though the order data is heterogeneous and possibly also encompassing multiple levels of distribution. The following FIG. 1A3 depicts such an approach.

FIG. 1A3 is a multi-level, multi-format example of a planning engine1A300 as used in systems for dynamic time-phased consumption-driven forecasting and replenishment planning. As an option, one or more instances of planning engine1A300 or any aspect thereof may be implemented in the context of the architecture and functionality of the embodiments described herein. Also, the planning engine1A300 or any aspect thereof may be implemented in any desired environment.

As shown, a single instance 115 is used for combining data from various points of sale (e.g., store_A), and to provide an ordering forecast to a particular supplier or manufacturer (e.g., MFG_P, MSG_Q, MFG_R, etc.) This architecture supports processing orders from any combinations of orders from stores and orders from other points in the distribution network, if such orders are available. For example manufacturer MFG_P might receive an order forecast generated by combining data from stores (e.g., store_A), and from other points within the distribution network such as from a vendor-managed inventory point (e.g., VMI_B), and/or from wholesalers and/or distributors (e.g., disty_C).

The architecture of FIG. 1B1 includes a system comprising a single instance 115 (see consumption driven planning engine 152) that is configured to accept order data in multiple formats, and is further configured to deliver forecasts to manufacturers in any or one or more forecast formats. As shown, forecasts from a store (see store_A), a vendor-managed inventory location (see VMI_B), and a distributor (disty_C) are received by the consumption driven planning engine 152, which in turn employs a forecasting and ordering module 154. The aforementioned forecasting and ordering module is able to compile a forecast that can be broken down into quantities pertaining to the items in the forecast that are handled by a corresponding supplier. As shown, a consolidated forecast is delivered to MFG_P, MFG_Q, and MFG_R. These manufacturers receive such orders, produce the ordered goods, and organize deliveries. The deliveries may then be provided to any agent or entity serving the function of replenishment functions 158 (e.g., storage, consolidation, just-in-time delivery, etc.). In some cases, the suppliers/manufacturers build to the consolidated forecast, and produce goods that are moved through a distribution network in accordance with a replenishment plan.

Various techniques to construct a replenishment plan can be used by the replenishment plan generator 157. In particular, the architecture of FIG. 1A3 supports techniques that use consumption data (e.g., POS data) and an inventory model 163 to generate a replenishment plan. The shown embodiment generates a replenishment plan based on an inventory model 163 (e.g., including a service level model, including a safety stock strategy), and a stock level calculator 156. A safety stock strategy can be selected using a strategy selector 161, as shown.

As such, the architecture of FIG. 1A3 supports a technique where a computing resource can receive point-of-sale data in a first data format (e.g., comprising item identifier, a date or date range and an origin identifier, etc.), and can also receive additional distribution-level data in a second data format (e.g., comprising the item identifier in a different representation, a date or date range and an origin identifier, etc.). The computing resource (e.g., configured to execute consumption-driven planning engine) can then combine the first point-of-sale data from a first entity (e.g., Entity_1, such as MallMart, Inc.) with distribution-level data from a second entity (e.g., Entity_2 and/or Entity_3, such as SysKo, Inc.) to generate a combined forecast, which in turn can be used to generate a replenishment plan.

Further steps can be performed, such as formatting the combined forecast into a data format convenient for the manufacturers or other recipients. In some cases, orders can be manipulated into a single common format, however the source of the orders—even though in a common format—often impacts and or determines the interpretation of such orders. As heretofore mentioned, an agent or entity acting in a wholesaling capacity might order on the basis of historical order quantities and/or projected/forecasted time frames and/or lead times. In some situations an agent or entity acting in a wholesaling capacity might order on behalf of a large number of the wholesaler's customers, sometimes over-ordering in the hope of meeting any spikes in demand that are not reflected in the historical order quantities. This technique is sometimes considered in the calculation of "safety stock". Ordering safety stock can be effective in some situations, however in some situations the stock is expensive and/or perishable, and in many situations the ordering of safety stock tends to induce unwanted effects such as undesirable financial effects (e.g., resulting from carrying charges) and/or unwanted operational effects (e.g., excess stock on hand, spoiled or expired goods, etc.). Techniques that combine wholesale ordering techniques (e.g., ordering based on distribution center forecasts and/or inventory levels) with retail-level ordering techniques (e.g., ordering based on point-of-sale data) can be employed to improve accuracy and avoid a range of unwanted effects. One such situation is described and addressed as pertains to the following FIG. 1B1.

FIG. 1B1 depicts a planning scenario 1B 100 that combines point-of-sale data and inventory data as used in systems for dynamic time-phased consumption-driven forecasting and replenishment planning. As an option, one or more instances of planning scenario 1B100 or any aspect thereof may be implemented in the context of the architecture and functionality of the embodiments described herein. Also, the planning scenario 1B100 or any aspect thereof may be implemented in any desired environment.

The problems associated with coarse, and sometimes very inaccurate forecasting by wholesale channels, are solved by including retail-level detailed historical sales data and retail-level forecasts when generating replenishment and inventory quantities. Some systems employ data collection facilities (e.g., point-of-sale barcode readers) as well as use of stored raw and calculated data (e.g., previous sales figures, previous forecasts, calculated average on-shelf amounts, peak and minimum daily sales figures, etc.).

As shown in FIG. 1B1, a consumption driven planning engine 152 receives point-of-sale data 141 as well as inventory data 143. The point-of-sale data 141 and the inventory data 143 derive from different sources, each of which different source uses different techniques for collecting and disseminating the data. For example, and as shown, point-of-sale data 141 can come in the form of store-level data at the time-wise granularity of daily sales 164 and/or monthly sales 170. In some cases (e.g., see "Store_A") the daily sales 164 might be collected using one method (e.g., register/scanner data), and the monthly sales 170 might be collected using a different method (e.g., monthly on-the-shelf inventory counts and comparison to monthly order amounts). In other cases (e.g., see "Store_B") only daily sales data is collected, and Store_B does not use any method to collect or disseminate monthly data. In another situation (e.g., "Store_C"), only weekly sales data is collected. In still other situations (e.g., see "Store_D") all of daily, weekly and monthly sales data are collected for analysis and dissemination. In many cases, the technique used for collecting instances of point-of-sale data 141 and the technique used for collecting instances of inventory data 143 may be different, and in some cases may depend on the nature of the providing point-of-sale entity. For example, "Store_A" uses "Format_A", "Store_B" uses "Format_B", "Store_C" uses "Format_C", and so on.

The origin of such different inputs and/or different formats can be determined by the shown consumption driven planning engine 152. For example, the origin of the received point-of-sale data can be determined using an address identifier or address label (e.g., a label attached to or within a data container), an IP address (e.g., possibly including a port), a network identifier (e.g., a wireless SSID), and/or a URL (e.g., that identifies the location of the sender, or location of one or more application programming interface calls). In some cases a different input channel and/or application programming interface is used for each format. The aforementioned constituents of an address identifier can be used singly or in combination to form an address identifier sufficient to identify the origin. In some cases, an address identifier can identify not only the origin, but also the originator.

As earlier indicated, the practice of over-ordering (e.g., by wholesale channels and/or distribution channels) to amass inventory, "just in case" still sometimes fails to mitigate the potential for lost sales during periods of higher demand. Further as earlier indicated, amassing the excess stock may be expensive or may be impractical.

A data preprocessor 186 and a predictor 182 can be configured to receive point-of-sale data, to identify the preparer or sender or the data, to resolve the received point-of-sales data to a daily forecast (or hourly forecast or any other time-period) and confirm that the inventory data 143 supports the time-sequenced demand given in the point-of-sale data. In some cases, the inventory can be predicted to be too low (e.g., relative to a period of high demand from the retail outlets), and a predictor 182 might increment an existing order, or might issue a supplemental order to the manufacturer of the items that are drawn down during periods of high demand from the retail outlets. In some cases, and as shown in FIG. 1B1, the predictor 182 includes a time-wise and quantity-wise model for ordering, and an additional module processes the time-wise and quantity-wise model to generate one or more orders that comport with the order formatting and submission characteristics as may be specified by the various manufacturers.

In exemplary cases, the volume of data comprised by the point-of-sale data 141 and the inventory data 143 is huge, and orders are processed by a computer and provided to the manufacturer as computer-readable data items. Often, the orders themselves are huge, and are transmitted from an order management system 184 to one or more computer systems administrated by the one or more manufacturers. The manufacturers in turn use such data in their own procurement systems so as to procure enough raw materials and/or partially-finished goods be able to manufacture enough quantities, and in time to satisfy the flow of orders. In such exemplary cases, a system such as pertains to FIG. 1B2 is deployed. Use of such a system is now briefly discussed.

FIG. 1B2 is a system 1B200 for combining point-of-sale data and inventory data as used to implement dynamic time-phased consumption-driven forecasting and replenishment planning. As an option, one or more instances of system 1B200 or any aspect thereof may be implemented in the context of the architecture and functionality of the embodiments described herein. Also, the system 1B200 or any aspect thereof may be implemented in any desired environment.

The shown system 1B200 includes a database engine 198, which includes a persistent storage system 196. Such a persistent storage system serves as a repository for point-of-sale data (e.g., daily sales 164, weekly sales 176, monthly sales 170, etc.), as well as for inventory data (e.g., data from wholesale channels and/or distribution channels 188). The aforementioned data can be stored in any format (e.g., in tables and/or in files), and any data needed by the consumption driven planning engine 152 and/or its constituent components (e.g., data preprocessor 186, predictor 182, etc.) can be delivered in forms used by relational database systems. Strictly as one example, data stored in files can be converted into tables or relations by the shown relational data management facility $194_1$. Moreover, data stored in relations can be converted into tables by the shown relational data management facility $194_2$.

The data can be stored in any time-wise format, and can be converted into any other time-wise format using any known technique. For example, point-of-sale data and/or inventory data might be received and stored in a highly granular time-wise data format (e.g., levels by day, or levels by hour) and can be converted into a less granular time-wise data format (e.g., levels by week). Or, in other situations, for example, point-of-sale data and/or inventory data might be received and stored in a coarse time-wise data format (e.g., levels by week, or levels by month) and can be converted into a highly granular time-wise data formats (e.g., levels by day or by hour). The received data can be stored persistently, and thus a history can be assembled. In some cases, a calendar is superimposed over a historical period, and store sell-in or channel sell-through data can be recognized and/or tagged as corresponding to a holiday or as corresponding to seasonal periods. Further, a calendar is superimposed over a forecast period, and a predicted days-of-supply and/or store lead-time can be calculated and used by an order management and/or by a manufacturing procurement system.

FIG. 2A depicts a data flow 2A00 for combining multi-level heterogeneous ordering data as used in systems for dynamic time-phased consumption-driven forecasting. As an option, one or more instances of data flow 2A00 or any aspect thereof may be implemented in the context of the architecture and functionality of the embodiments described herein. Also, the data flow 2A00 or any aspect thereof may be implemented in any desired environment.

As shown in FIG. 2A, a single instance 115 comprising an incoming data processing module 297 receives a first set of point-of-sale data in a first data format (e.g., point-of-sale data $141_1$, point-of-sale data $141_3$, point-of-sale data $141_{N-1}$, etc.). The first set of point-of-sale data comprises dates and/or date ranges and describes sales of one or more particular items (e.g., via a SKU number or other item identifier). The incoming data processing module can know the origin of the data from the communication link and/or can know the origin of the data based on a transmitted first point of sale identifier. The point-of-sale data refers to an item 117 or items sold on a given date or dates and/or sold within specified date ranges (e.g., daily sales 164, weekly sales 176, monthly sales 170, etc.).

Also, the single instance 115 is capable of receiving data from distribution channels (e.g., distribution channel data $188_1$, distribution channel data $188_N$, etc.). The data from the distribution channels may be stored and/or transmitted in a first data format as described above, or the distribution channel data may be stored and/or transmitted in a second data format. Even when the second data format is very different from the first data format, the item identifiers and/or dates and/or date ranges the meanings may be the same.

Data can be received in, retained in, and output in any known time format or granularity. Any known techniques can be used to convert between time formats and granularities, and such techniques can be used to reconcile dates and/or date ranges as may be received within the first and second point of sales data. An instance of a data preprocessors $186_0$ serves to receive at least a portion of the first point-of-sale data with at least a portion of the distribution channel data to generate a combined forecast 223. The combined forecast can be formatted and/or re-formatted into a reformatted combined forecast 225 suited to be sent to one or more suppliers. In some cases, data can be stored in a first data table to contain store-level demand data (e.g., for a particular customer or entity) and in a second data table to contain aggregate data (e.g., DC level data for another customer or entity). In such a scenario, and for a given product and time period (e.g., week, month, quarter, etc.), a combined forecast is deemed to be the sum of DC-level demand plus store-level demand.

In the embodiment shown, an outgoing data processing module 298 serves to generate a reformatted combined forecast. The reformatted combined forecast comprises a forecasted quantity of items to be manufactured and/or delivered by a certain date (e.g., the POS needs the quantity to be delivered next Saturday) or the reformatted combined forecast comprises a quantity to be manufactured and/or delivered at some date within a particular date range (e.g., the POS need to process a particular quantity of incoming stock for within the week of December 10-December 17). Strictly as examples, forecasts can be provided as tables, and may cover any time range (e.g., daily forecast 264, weekly forecast 276, monthly forecast 270, etc.).

Once generated, the outgoing data processing module 298 sends (e.g., transmits) the reformatted combined forecast over a data link. Further, at any point in time, the incoming processing system and/or the outgoing processing system can retrieve and/or store data from/to the persistent storage system 196. The persistent storage system 196 can store point-of-sales data from any source, including instances of brick-and-mortar stores, instances of kiosks, and/or instances of online stores, etc.

Figure 2B:
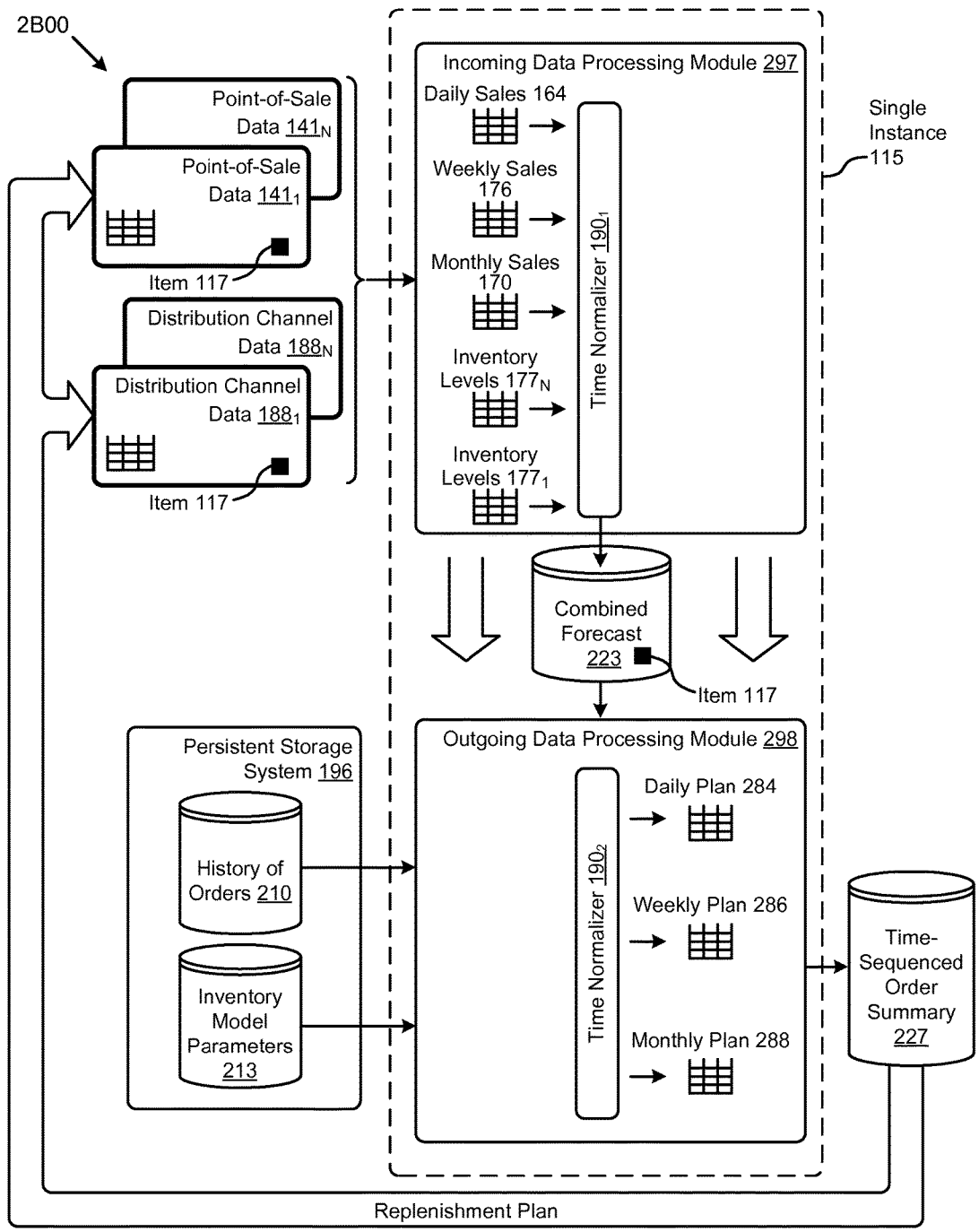
FIG. 2B depicts a data flow for combining point-of-sale data and inventory data as used to implement dynamic time-phased consumption-driven planning, according to some embodiments.

FIG. 2B depicts a data flow 2B00 for combining point-of-sale data and inventory data as used to implement dynamic time-phased consumption-driven planning. As an option, one or more instances of data flow 2B00 or any aspect thereof may be implemented in the context of the architecture and functionality of the embodiments described herein. Also, the data flow 2B00 or any aspect thereof may be implemented in any desired environment.

As shown in FIG. 2B, a single instance 115 hosts an incoming data processing module 297, which is configured to receive point-of-sale data (e.g., point-of-sale data $141_1$, data $141_N$, etc.) from various points of sale (e.g., instances of brick-and-mortar stores, instances of kiosks, and/or instances of online stores, etc.). The incoming data processing module 297 is further configured to receive inventory data from one or more agents or entities within the distribution-level ecosystem. The aforementioned inventory data (e.g., inventory levels $177_1$, inventory levels $177_N$, etc.) includes an identifier of an item 117 or multiple identifiers of multiple items and corresponding dates or date ranges that characterize the inventory levels for the item or items on that date or those dates.

In exemplary situations, the incoming data is stored to the persistent storage system 196 in the granularity as received. When two or more incoming data items need to be combined, they can be retrieved and then converted into a normalized format. Using this technique, only the data needed, and furthermore, only the data corresponding to the data needed at a particular moment in time and/or for a particular purpose, need be converted or normalized.

Continuing, a data preprocessor combines point-of-sale data with inventory data to generate a combined forecast for the item or items. As shown, an outgoing data processing module 298 is configured with an instance of time normalizer $190_2$ and a data preprocessor $186_1$ to retrieve any portions of combined forecast 223, plus any other data (e.g., data stored at persistent storage system 196) to be combined, normalized, and formatted into time-sequenced inventory and replenishment plans. The plan can be in any granularity for time (e.g., daily plan 284, weekly plan 286, monthly plan 288, etc.), and/or the plan can be in any granularity for units (e.g., single items, cartons, cases, pallets, etc.). In exemplary cases, the act of formatting the combined forecast results in a replenishment plan such as a time-sequenced order summary 227. The time-sequenced order summary includes a plan for time-sequenced replenishment of the item or items. In other cases, the time-sequenced order summary 227 includes a plan for maintaining a safety stock of an item, where such a plan comprises a time-sequenced plan for safety stock levels. Aspects of safety stock, stock replenishment strategies, and processing of data to generate a safety stock plan, are discussed in following paragraphs.

Figure 2C:
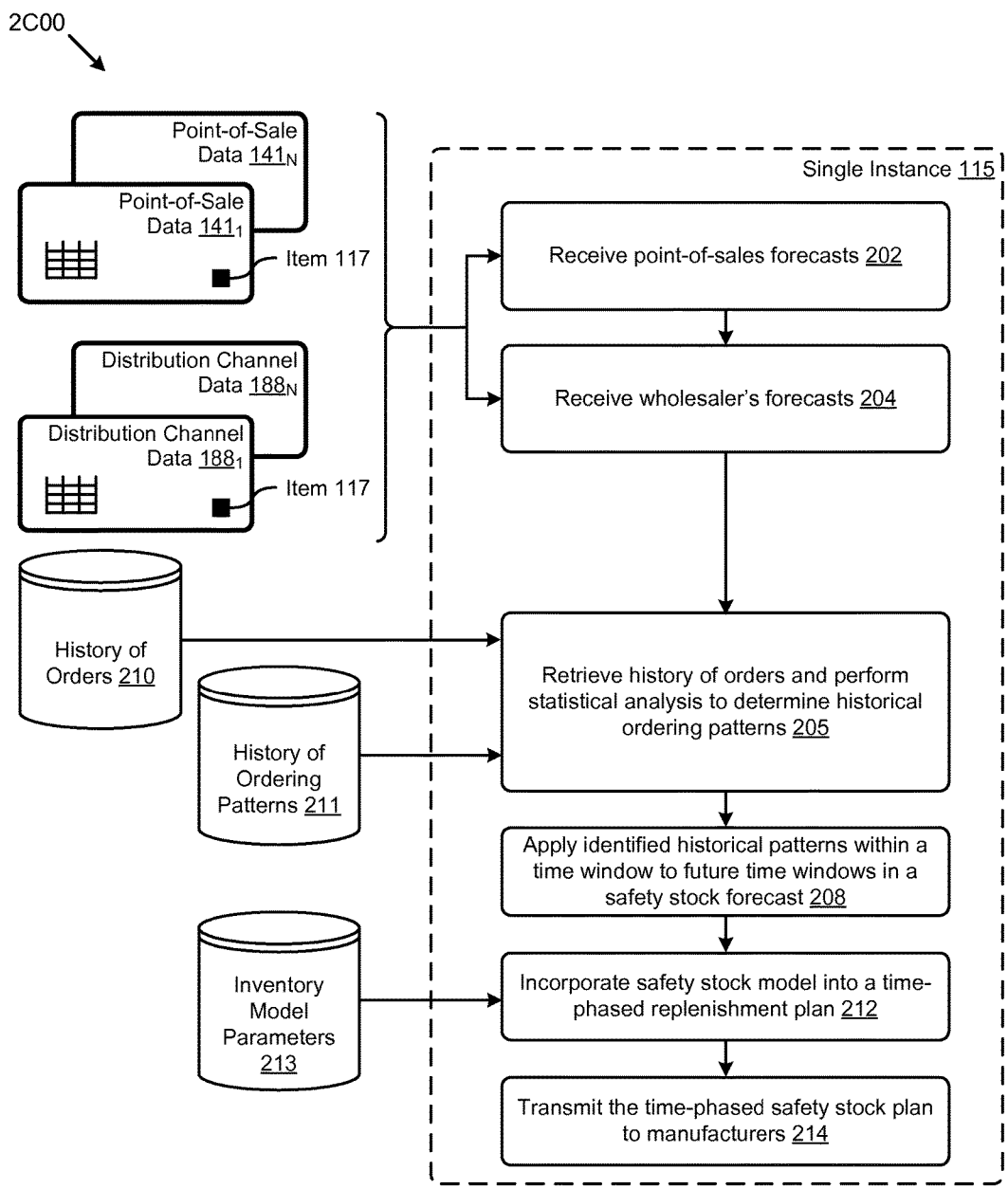
FIG. 2C depicts a data flow for combining point-of-sale data, inventory data, and historical data to form a time-phased safety stock plan, according to some embodiments.

FIG. 2C depicts a data flow for combining point-of-sale data, inventory data, and historical data to form a time-sequenced safety stock plan. As shown, the single instance 115 receives point-of-sale forecasts (see operation 202) and wholesaler's forecasts (see operation 204). A datastore comprising a history of orders 210 and/or a history of ordering patterns 211 is accessed. An operation (see operation 205) performs various statistical analysis on the history of ordering patterns 211.

The statistical analysis (e.g., correlation analysis) performed in operation 205 facilitates identification of ordering patterns, and such ordering patterns might be of a nature that they re-occur. For example, a point-of-sale outlet might sell a large number of strawberry pop-tarts during the hurricane season. And, since the hurricane season re-occurs annually, the annually-recurring pattern of ordering of strawberry pop-tarts emerges from analysis of the ordering history.

In an exemplary situation, the identified historical ordering patterns (such as "last year's hurricane season") are applied to future time windows such as "the upcoming hurricane season" (see operation 208). During this or subsequent steps, a data structure can be prepared to organize items and corresponding quantities into a forecast that observes inventory model parameters 213. Inventory model parameters include delivery intervals, maximum volume to be delivered at any interval, service levels, etc.

The aforementioned forecast can be used to generate a replenishment plan (e.g., a time-sequenced safety stock plan) such that an order for a particular item 117 can be broken down into quantities and corresponding time frames so as to, for example, schedule deliveries in accordance with delivery intervals (see operation 212). In some cases, the time frames include calculation of lead times (e.g., lead time from placement of the order to the availability at the final point-of-sale location). When a replenishment plan is ready, it can be communicated to suppliers and/or manufacturers (see operation 214).

As can be seen from inspection of FIG. 2C, the point-of-sale forecasts (see operation 202) are distinguished from wholesaler's forecasts (see operation 204). One technique to facilitate this distinction is to use a data structure to codify a site. Further, when a site is a point-of-sale site, one designation versus another designation can be codified in a data structure. Such data structures are exemplified in the following.

Figure 3A:
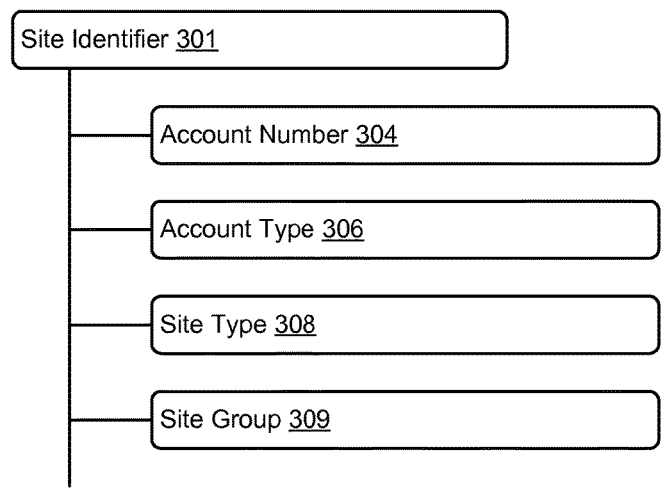
FIG. 3A and FIG. 3B depict a data structure for combining multi-level heterogeneous ordering data as used in systems for dynamic time-phased consumption-driven forecasting and replenishment planning.
Figure 3B:
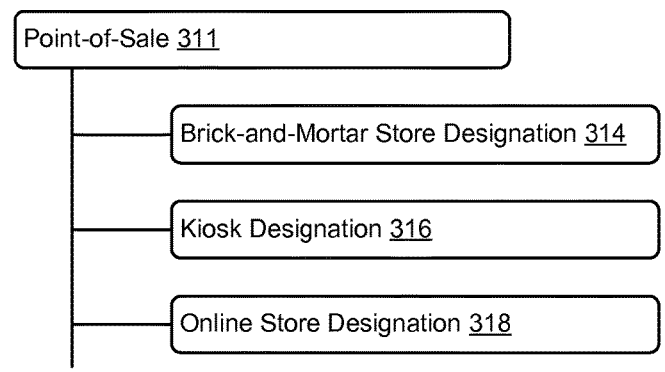

FIG. 3A and FIG. 3B depict a data structure for combining multi-level heterogeneous ordering data as used in systems for dynamic time-phased consumption-driven forecasting and replenishment planning. As an option, one or more instances of the shown data structures or any aspect thereof may be implemented in the context of the architecture and functionality of the embodiments described herein. Also, the data structures or any aspect thereof may be implemented in any desired environment.

As shown in FIG. 3A, a site (e.g., a manufacturer's site, a supplier's site, a distribution center site, a point-of-sale site, etc.) can be more precisely characterized using data structure 3A00. Specifically, site identifier 301 can hold an account number 304, an account type 306, a site type 308, and a site group 309. Strictly as examples, a site identifier 301 might be a unique identifier such as a name; an account number can be an alphanumeric sequence; an account type can refer to any one of, a manufacturer, a supplier, a distributor, a point-of-sale operator, etc.; a site type can tag the site as a wholesaler or retailer; and the site group can refer to a taxonomy for a genus of different species. In some cases, a site identifier 301 further has a corresponding IP address (e.g., possibly including a port), a network identifier (e.g., a wireless SSID), and/or a URL.

One case of a site group comprises a point-of-sale group. A member of a point-of-sale group can be further described using data structure 3B00, which in turn can specify designations such as given by a brick-and-mortar designation 314, a kiosk designation 316, and an online store designation 318. Any of the foregoing data structures and/or designations can be used in any of the embodiments disclosed herein.

Figure 4A:
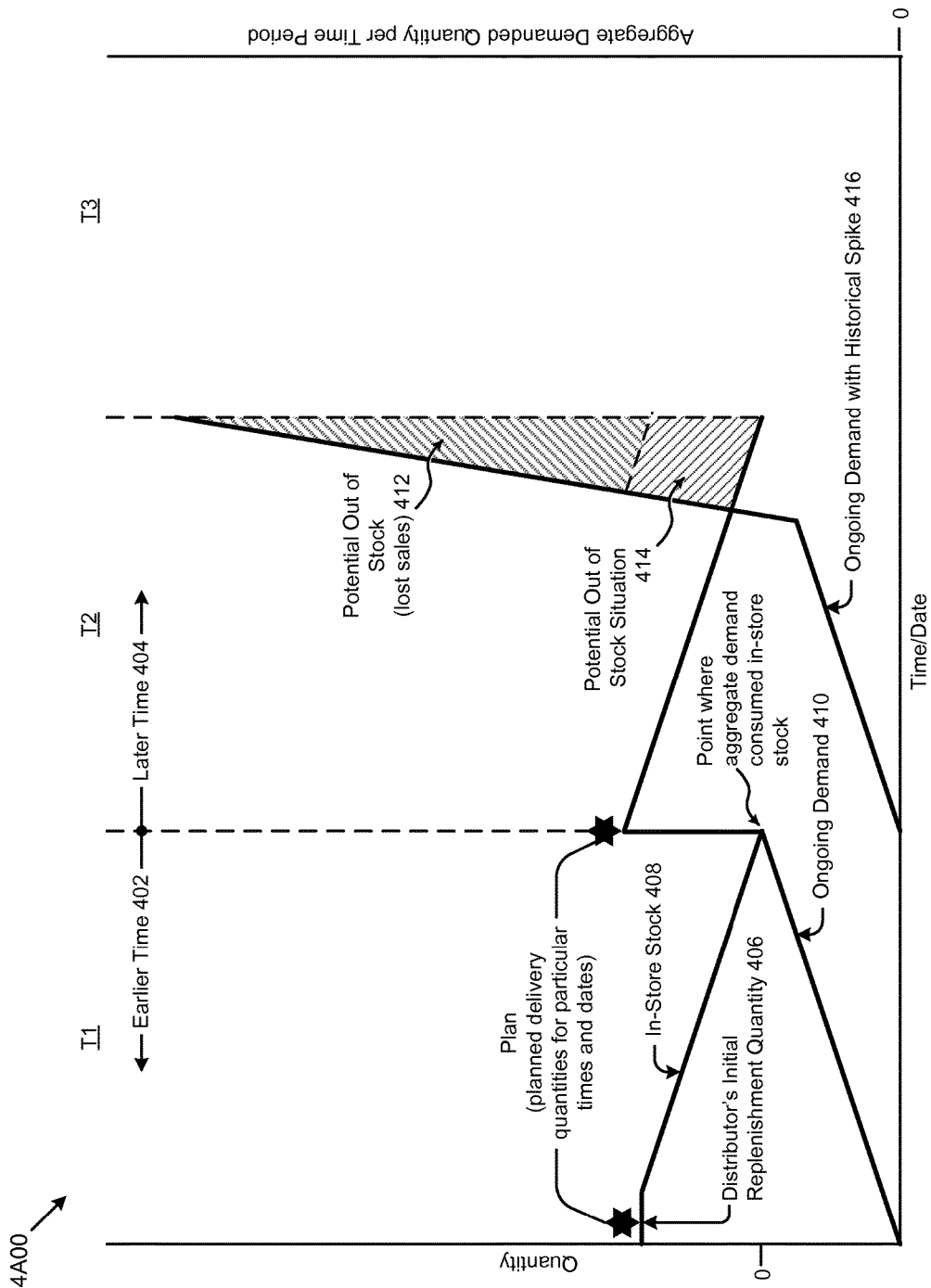
FIG. 4A presents a case study showing the effects of a 95% service level safety stock strategy as used in systems for dynamic time-phased consumption-driven forecasting and replenishment planning, according to some embodiments.

FIG. 4A presents a case study 4A00 showing the effects of a 95% service level safety stock strategy as used in systems for dynamic time-phased consumption-driven forecasting and replenishment planning. As an option, one or more instances of case study 4A00 or any aspect thereof may be implemented in the context of the architecture and functionality of the embodiments described herein. Also, the case study 4A00 or any aspect thereof may be implemented in any desired environment.

FIG. 4A shows time periods T1, T2, and T3 over a continuous time period depicted by the abscissa (x-axis). The origin (y-axis) depicts volume or quantities of an item. Superimposed onto the graph of case study 4A00 is an indication of a distributor's initial replenishment quantity (see point 406). The chart depicts depletion of the distributor's initial replenishment quantity over time (see line segment 408). As shown, the depletion of the quantity over time is inverse to the ongoing demand line (see line segment 410). At some point in time, the distributor's initial replenishment amount becomes depleted (e.g., see the boundary between time period T1 and time period T2). At the beginning of time period T2, an amount equal to the distributor's initial replenishment amount is delivered to replenish the in-store stock, and again ongoing demand takes down the in-store stock. Given no changes to the scenario, the scenario can re-occur indefinitely without running out of stock. However, in a situation when there is a spike in demand (e.g., as depicted by spike 416) it is possible that the in-store stock would not be enough to satisfy the shown spike in demand. This sets up the condition for a potential out-of-stock situation 414. If the spike in demand were to continue (as shown) the lost sales situation is exacerbated, resulting in the severe out-of-stock situation 412. There are many variables, one of which is the specific timing of replenishment. For example, if the distributor were to have replenished just a short time period earlier that is shown, the potential out-of-stock situation 414 could have been avoided.

In some cases, and in particular, in cases where historical data is available (and when statistics can be performed over the historical data), it is possible to amass safety stock to cover demand that the predictions and/or planning tools did not predict. For example, an increased replenishment amount and timing for delivery of same can be calculated so as to provide enough stock even over the entirety of the spike in demand with a (for example) "95% certainty" or at a "95% service level".

Providing a near 100% safety stock might be an appropriate strategy for certain items (e.g., low-cost non-perishables), however other strategies might be employed, for example, when the items to be stocked are expensive relative to lost opportunities. Embodiments disclosed herein support analysis and selection of various alternative safety stock replenishment level strategies.

Figure 4B:
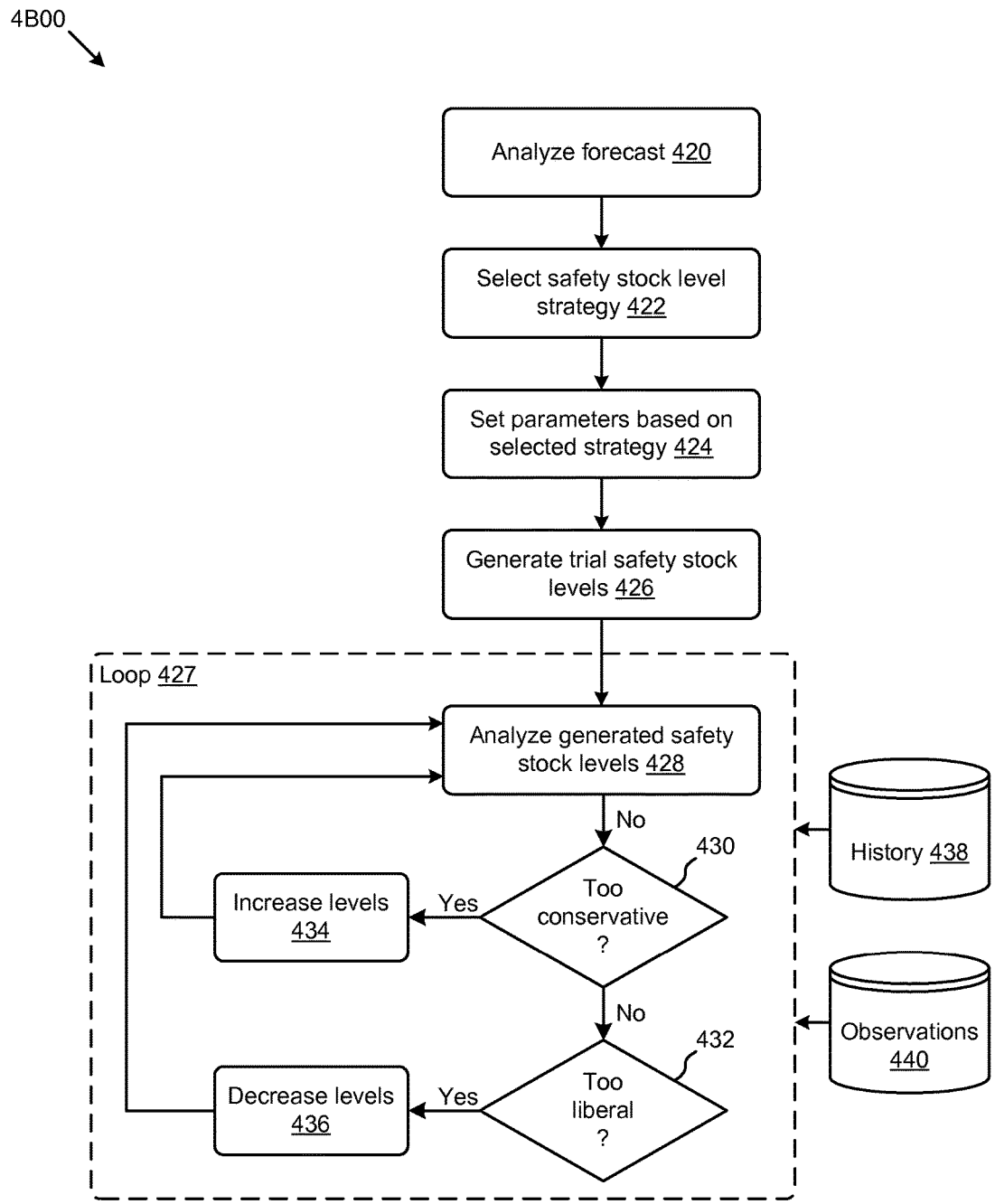
FIG. 4B presents a data flow for selecting a safety stock replenishment strategy as used in dynamic time-phased consumption-driven forecasting and replenishment planning, according to some embodiments.

FIG. 4B presents a data flow 4B00 for selecting a safety stock replenishment strategy as used in dynamic time-phased consumption-driven forecasting and replenishment planning. As an option, one or more instances of data flow 4B00 or any aspect thereof may be implemented in the context of the architecture and functionality of the embodiments described herein. Also, the data flow 4B00 or any aspect thereof may be implemented in any desired environment.

As shown in FIG. 4B, a processing loop 427 includes decisions to be made if the parameters corresponding to a particular selected safety stock replenishment strategy result in a safety stock level that is deemed to be too conservative (see decision 430) or deemed to be too liberal (see decision 432). The loop can be entered after a trial safety stock level has been generated (see operation 426). In some cases a trial safety stock level can be initially generated after analyzing an available forecast (see operation 420), selecting a safety stock level strategy (see operation 422), and setting parameters based on the selected strategy (see operation 424).

As shown, once trial safety stock levels have been generated, the processing loop 427 serves to analyze generated safety stock levels and to compare the generated safety stock levels (see operation 428) to any available observations 440 and history (e.g., see history 438). Such a history can be the same as, or derived from, the aforementioned history of ordering patterns, or history 438 can be derived from one or more different sources.

The selection of a safety stock strategy, and/or modifications to safety stock parameters (e.g., to increase levels 434, or to decrease levels 436), can be performed iteratively. A replenishment plan can be generated using the selected safety stock strategy, and selected safety stock parameters.

Figure 4C:
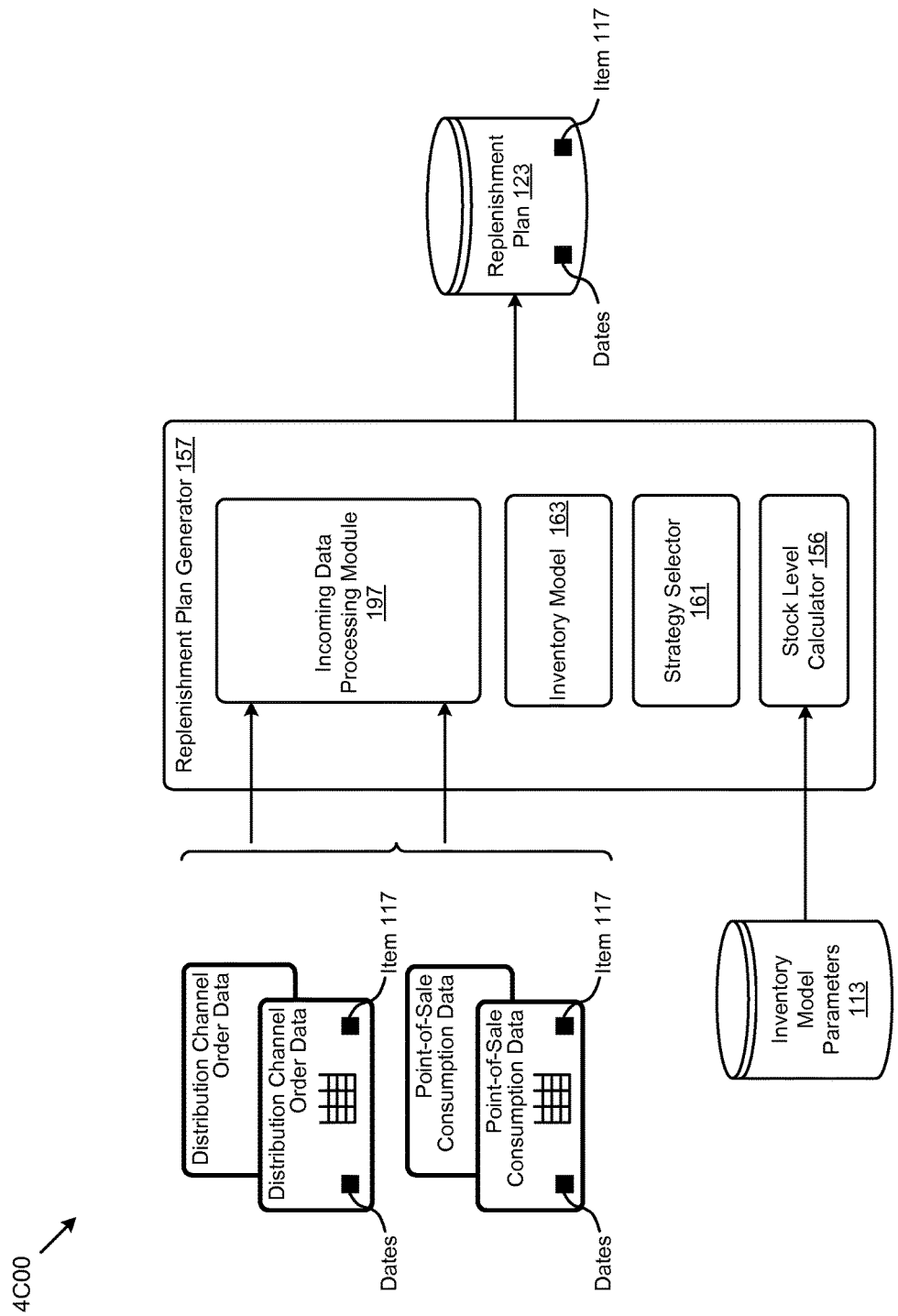
FIG. 4C presents a data flow for generating a replenishment plan based on a safety stock replenishment strategy as used in dynamic time-phased consumption-driven forecasting and replenishment planning, according to some embodiments.

FIG. 4C presents a data flow 4C00 for generating a replenishment plan based on a safety stock replenishment strategy as used in dynamic time-phased consumption-driven forecasting and replenishment planning, according to some embodiments.

The shown data flow commences upon receiving first point-of-sale consumption data comprising item identifiers and a date or date range, then receiving distribution-level order data, comprising item identifiers referring to at least some of the same items. The data is processed by an incoming data processing module (e.g., to reconcile dates and account for format variations) before the replenishment plan generator 157 outputs a replenishment plan 123.

As shown, the stock level calculator accesses inventory model parameters 113 (e.g., based on a selected inventory model and/or selected replenishment strategy), then combines the point-of-sale consumption data with the distribution-level order data to generate a time-phased replenishment plan for the identified items (e.g., when a particular quantity of a particular item or set of items should be delivered to a particular location).

The selection of an inventory model, a safety stock strategy, and/or modifications to safety stock parameters can be done using a user interface. One example of such a user interface is shown and discussed as pertaining to the user interfaces of FIG. 5A and FIG. 5B.

FIG. 5A is a user interface 5A00 showing characteristics of a lead-time safety stock replenishment strategy as used in dynamic time-phased consumption-driven forecasting and replenishment planning. As an option, one or more instances of user interface 5A00 or any aspect thereof may be implemented in the context of the architecture and functionality of the embodiments described herein. Also, the user interface 5A00 or any aspect thereof may be implemented in any desired environment.

In FIG. 5A, a set of items (e.g., Item01, Item02, . . . , Item06) are each associated with safety stock parameters 501. As shown, the safety stock strategy "SS Lead Time" is selected from a set of alternative safety stock strategies (see strategy selector menu 502 of FIG. 5B). The strategy can use a user-supplied service level 542, which (for example) might be used as a confidence interval. The strategy can also optionally specify a service standard error value 544, a days of supply override, and an optional safety stock override. Additional parameters can be provided, which parameters may depend from the given strategy. For example, in the case that the safety stock strategy "SS Lead Time" is selected, then the store-specific target number of days of supply is calculated (see column 546) as well as other values for display to a user. The safety stock parameters and any overrides are considered in calculations, and a final safety stock value is calculated (see column 548).

The foregoing discussion of FIG. 5A includes aspects of the safety stock strategy selection and "SS Lead Time" (safety stock lead time). However, other safety stock selections are possible, some of which safety stock selections are shown and discussed as pertaining to the following FIG. 5B.

FIG. 5B is a user interface 5B00 showing characteristics of a "days of supply" safety stock replenishment strategy as used in dynamic time-phased consumption-driven forecasting and replenishment planning. As an option, one or more instances of user interface 5B00 or any aspect thereof may be implemented in the context of the architecture and functionality of the embodiments described herein. Also, the user interface 5B00 or any aspect thereof may be implemented in any desired environment.

As shown in FIG. 5B, the strategy selector menu 502 facilitates user selection of a particular safety stock strategy. The shown choices include, "Safety Stock Days of Supply", "Safety Stock Fixed Percent", "Safety Stock Lead Time", and "Safety Stock Statistical". With "Safety Stock Days of Supply" safety stock is calculated based on the target number of days of supply to be maintained at the store. With "Safety Stock Fixed Percent" safety stock is calculated based on a percentage of the days of supply to be maintained at the store. With "Safety Stock Lead Time" safety stock is calculated based on the forecast requirements during the lead time to ship the product to the store. With "Safety Stock Statistical" safety stock is calculated using the forecast, standard error and the lead time to ship the product to the store. This example depicts the situation where the user selected the "Safety Stock Days of Supply" strategy, and the days of supply-based safety stock screen device 513 depicts the user-defined parameters and calculated values. A particular safety stock replenishment strategy can be selected using a screen widget, and a selection can be known on the basis of a menu item value or any other selection technique involving one or more of, a fixed percent indication, a lead time indication, a service level indication, or a days of supply indication.

Additional Embodiments of the Disclosure

Figure 6:
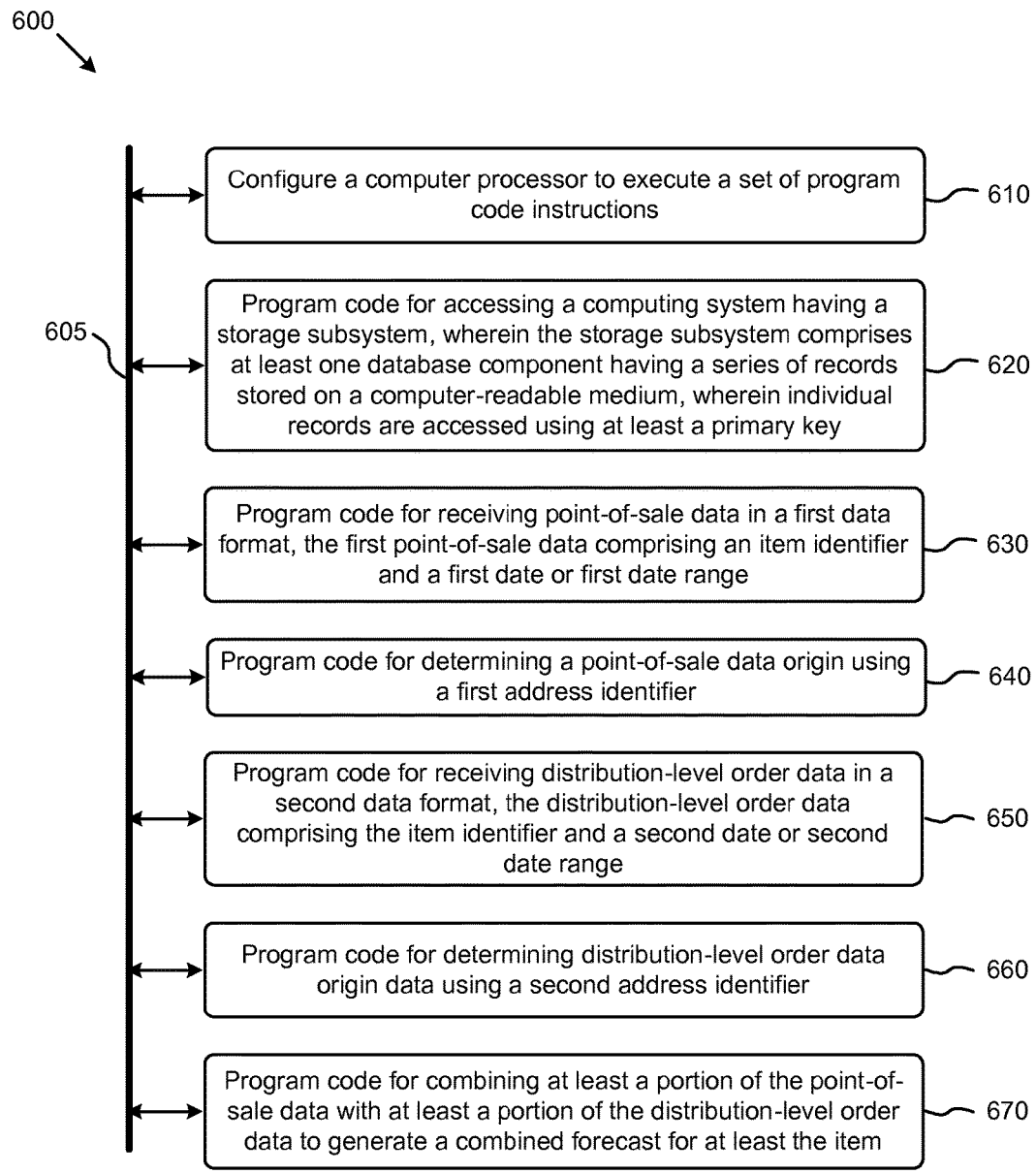
FIG. 6 is a block diagram of a system for dynamic time-phased consumption-driven forecasting and replenishment planning, according to some embodiments.

FIG. 6 is a block diagram of a system for dynamic time-phased consumption-driven forecasting. As an option, the present system 600 may be implemented in the context of the architecture and functionality of the embodiments described herein. Of course, however, the system 600 or any operation therein may be carried out in any desired environment. As shown, system 600 comprises at least one processor and at least one memory, the memory serving to store program instructions corresponding to the operations of the system. As shown, an operation can be implemented in whole or in part using program instructions accessible by a module. The modules are connected to a communication path 605, and any operation can communicate with other operations over communication path 605. The modules of the system can, individually or in combination, perform method operations within system 600. Any operations performed within system 600 may be performed in any order unless as may be specified in the claims. The embodiment of FIG. 6 implements a portion of a computer system, shown as system 600, comprising a computer processor to execute a set of program code instructions (see module 610) and modules for accessing memory to hold program code instructions to perform: accessing a computing system having a storage subsystem, wherein the storage subsystem comprises at least one database component having a series of records stored on a computer-readable medium, wherein individual records are accessed using at least a primary key (see module 620); receiving point-of-sale data in a first data format, the first point-of-sale data comprising an item identifier and a first date or first date range (see module 630); determining a point-of-sale data origin using a first address identifier (see module 640); receiving distribution-level order data in a second data format, the distribution-level order data comprising the item identifier and a second date or second date range (see module 650); determining distribution-level order data origin data using a second address identifier (see module 660); and combining at least a portion of the point-of-sale data with at least a portion of the distribution-level order data to generate a combined forecast for at least the item (see module 670).

Figure 7:
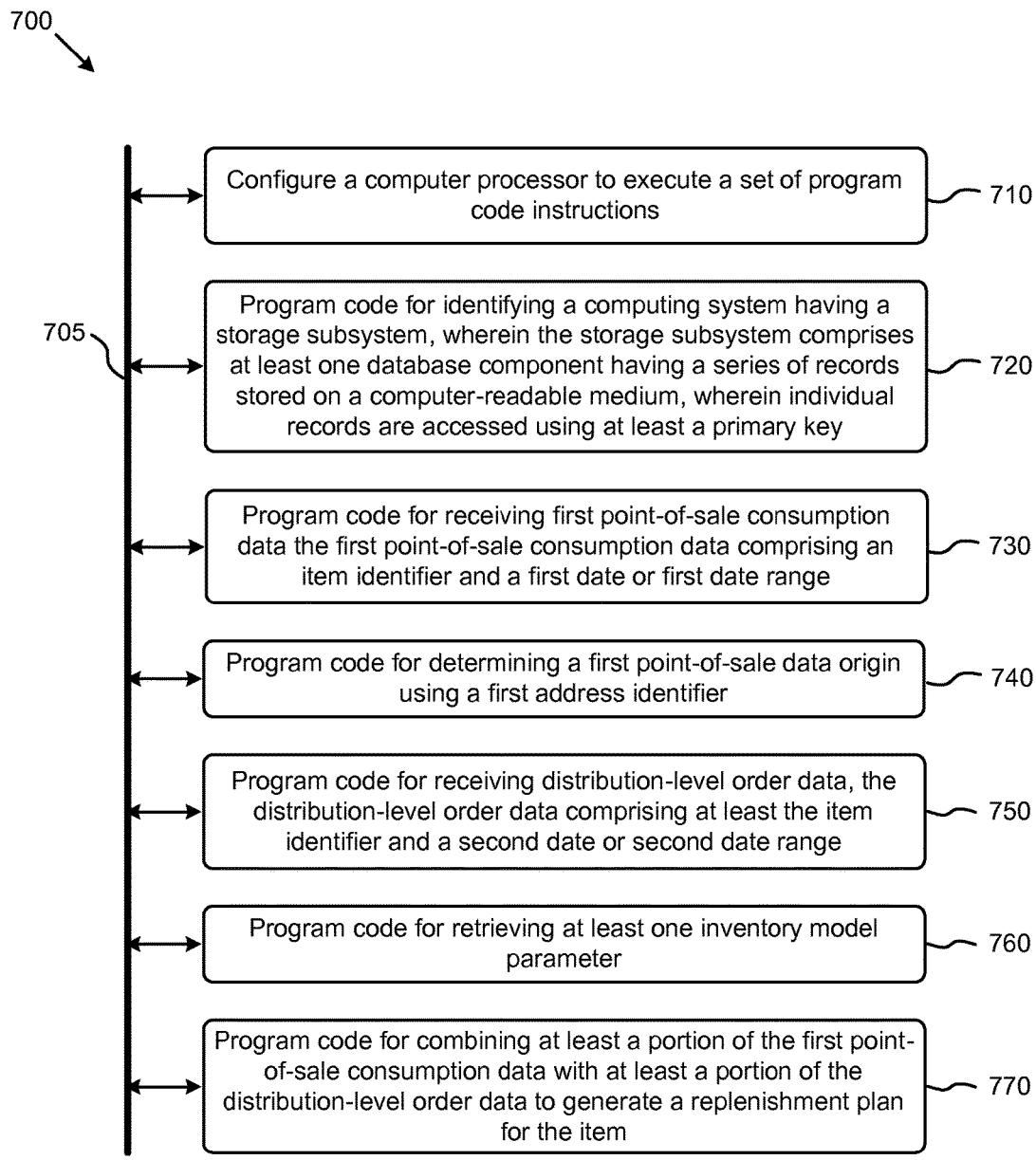
FIG. 7 is a block diagram of a system for dynamic time-phased consumption-driven forecasting and replenishment planning, according to some embodiments.

FIG. 7 is a block diagram of a system for dynamic time-phased consumption-driven planning. As an option, the present system 700 may be implemented in the context of the architecture and functionality of the embodiments described herein. Of course, however, the system 700 or any operation therein may be carried out in any desired environment. As shown, system 700 comprises at least one processor and at least one memory, the memory serving to store program instructions corresponding to the operations of the system. As shown, an operation can be implemented in whole or in part using program instructions accessible by a module. The modules are connected to a communication path 705, and any operation can communicate with other operations over communication path 705. The modules of the system can, individually or in combination, perform method operations within system 700. Any operations performed within system 700 may be performed in any order unless as may be specified in the claims. The embodiment of FIG. 7 implements a portion of a computer system, shown as system 700, comprising a computer processor to execute a set of program code instructions (see module 710) and modules for accessing memory to hold program code instructions to perform: identifying a computing system having a storage subsystem, wherein the storage subsystem comprises at least one database component having a series of records stored on a computer-readable medium, wherein individual records are accessed using at least a primary key (see module 720); receiving first point-of-sale consumption data the first point-of-sale consumption data comprising an item identifier and a first date or first date range (see module 730); determining a first point-of-sale data origin using a first address identifier (see module 740); receiving distribution-level order data, the distribution-level order data comprising at least the item identifier and a second date or second date range (see module 750); retrieving at least one inventory model parameter (see module 760); and combining at least a portion of the first point-of-sale consumption data with at least a portion of the distribution-level order data to generate a replenishment plan for the item (see module 770).

System Architecture Overview

Additional System Architecture Examples

Figure 8:
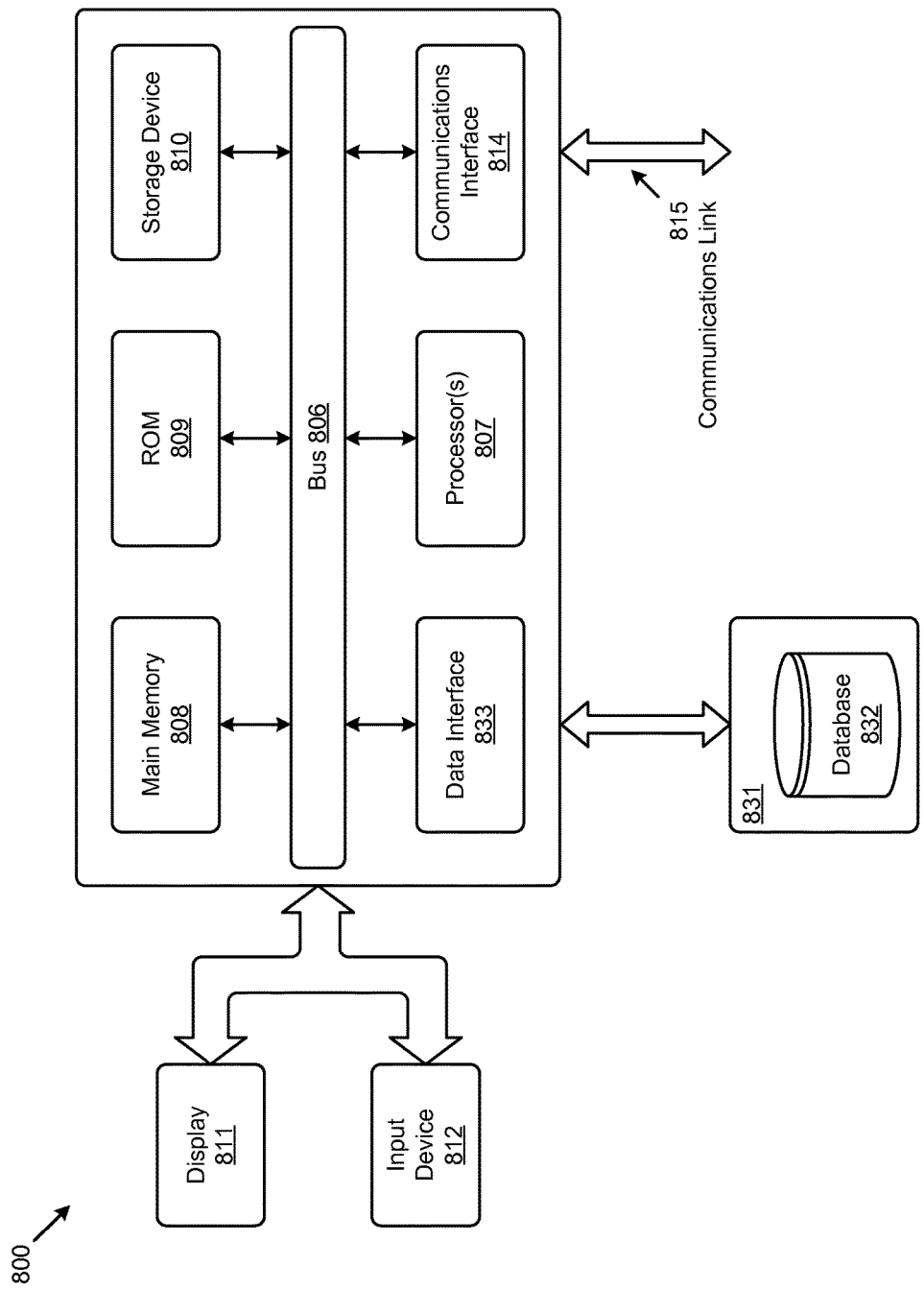
FIG. 8 depicts a block diagram of an instance of a computer system suitable for implementing embodiments of the present disclosure.

FIG. 8 depicts a block diagram of an instance of a computer system 800 suitable for implementing embodiments of the present disclosure. Computer system 800 includes a bus 806 or other communication mechanism for communicating information, which interconnects subsystems and devices, such as a processor 807, a system memory 808 (e.g., RAM), a static storage device (e.g., ROM 809), a disk drive 810 (e.g., magnetic or optical), a data interface 833, a communication interface 814 (e.g., modem or Ethernet card), a display 811 (e.g., CRT or LCD), input devices 812 (e.g., keyboard, cursor control), and an external data repository 831.

According to one embodiment of the disclosure, computer system 800 performs specific operations by processor 807 executing one or more sequences of one or more instructions contained in system memory 808. Such instructions may be read into system memory 808 from another computer readable/usable medium, such as a static storage device or a disk drive 810. In alternative embodiments, hard-wired circuitry may be used in place of or in combination with software instructions to implement the disclosure. Thus, embodiments of the disclosure are not limited to any specific combination of hardware circuitry and/or software. In one embodiment, the term "logic" shall mean any combination of software or hardware that is used to implement all or part of the disclosure.

The term "computer readable medium" or "computer usable medium" as used herein refers to any medium that participates in providing instructions to processor 807 for execution. Such a medium may take many forms, including but not limited to, non-volatile media and volatile media. Non-volatile media includes, for example, optical or magnetic disks, such as disk drive 810. Volatile media includes dynamic memory, such as system memory 808.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory medium from which a computer can read data.

In an embodiment of the disclosure, execution of the sequences of instructions to practice the disclosure is performed by a single instance of the computer system 800. According to certain embodiments of the disclosure, two or more computer systems 800 coupled by a communications link 815 (e.g., LAN, PTSN, or wireless network) may perform the sequence of instructions required to practice the disclosure in coordination with one another.

Computer system 800 may transmit and receive messages, data, and instructions, including programs (e.g., application code), through communications link 815 and communication interface 814. Received program code may be executed by processor 807 as it is received and/or stored in disk drive 810 or other non-volatile storage for later execution. Computer system 800 may communicate through a data interface 833 to a database 832 on an external data repository 831. Individual records within the database can be accessed using a primary key.

A module as used herein can be implemented using any mix of any portions of the system memory 808, and any extent of hard-wired circuitry including hard-wired circuitry embodied as a processor 807.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative sense rather than in a restrictive sense.

What is claimed is:

1. A method comprising:

identifying a computing system having a storage subsystem, wherein the storage subsystem comprises at least one database component having a series of records stored on a computer-readable medium, a first subset of the series of records being from a first plurality of sources, and a second subset of the series of records being from a second plurality of sources;

identifying, from the first subset of the series of records, a first source of data in a first data format, the first data format comprising at least an item identifier and a first date range, the first subset of the series of records having first address identifiers associated with the data in the first data format, the first address identifiers comprising at least one of an IP address, a network identifier, or a uniform resource locator, one more individual records of the data recorded in the first data format using a selected first application programming interface of a first plurality of application programming interfaces, the first application programming interface selected based on an origin of the at least some of the data in the first data format, wherein different application programming interfaces of the first plurality of application programming interfaces are used for processing different formats of the first subset of the series of records from the first plurality of sources;

identifying, from the second subset of the series of records, a second source of data in a second data format, the second data format comprising at least the item identifier and a second date range, the second subset of the series of records having second address identifiers associated with the data in the second data format, the second address identifiers comprising at least one of an IP address, a network identifier, or a uniform resource locator, one more individual records of the data recorded in the second data format using a selected second application programming interface of a second plurality of application programming interfaces, the second application programming interface selected based on an origin of the at least some of the data in the second data format, wherein different application programming interfaces of the second plurality of application programming interfaces are used for processing different formats of the second subset of the series of records from the second plurality of sources, wherein the first date range in the first data format is different from the second date range in the second data format;

converting records from both the first source of data in the first data format and the second source of data in the second data format into a normalized format;

combining at least a portion of the records from the first source of data in the normalized format with at least a different portion of the records from the second source of data in the normalized format to generate combined data for an item;

implementing a first user interface and a second user interface that is different than the first user interface, wherein the first user interface comprises a screen

19 widget having a selector menu for selecting different modifications of data that is displayed on the second user interface, the second user interface displaying a database table comprising:
  (i) a first column that identifies a selected modification to the item;
  (ii) a second column that holds results from a specific modification of the data that are derived from one or more additional parameters corresponding to the item based on the selected modification from the selector menu in the screen widget, wherein the selected modification is identified in the first column of the second user interface;
  (iii) a one or more additional columns that hold the one or more additional parameters corresponding to the selected modification identified in the first column; and
  (iv) a plurality of database table rows, each row from the plurality of database table rows corresponding to a different item;
receiving a selection of a modification of data in the first column of the second user interface through the selector menu from the screen widget on the first user interface; and
generating the data corresponding to the item in the second column of the database table within the second user interface based at least on the combined data for the item, the selected modification that was received from the first user interface, and the one or more additional parameters in the one or more additional columns of the second user interface.

2. The method of claim 1, further comprising transmitting a plan for the item to at least one originator of the second source of data.

3. The method of claim 1, further comprising determining a data origin using a first address identifier.

4. The method of claim 3, wherein the first address identifier comprises a site identifier.

5. The method of claim 4, wherein the site identifier comprises at least one of an account number an account type, a site type, a site group, a corresponding IP address, a network identifier, and a URL.

6. The method of claim 1, further comprising maintaining a repository of at least one model parameter.

7. The method of claim 1, wherein the additional parameters correspond to at least one of a confidence interval, a standard error value, or an optional override.

8. The method of claim 1, wherein the first source of data in a first data format is received from a first entity and the second source of data in a second data format is received from a second entity.

9. The method of claim 8, wherein the first entity is different from the second entity.

10. The method of claim 1, further comprising:
  transmitting a plan for the item to at least one originator of the second source of data;
  determining a data origin using a first address identifier;
  maintaining a repository of at least one model parameter; and
wherein:
  the first source of data in a first data format is received from a first entity and the second source of data in a second data format is received from a second entity, the first entity is different from the second entity, the first data corresponds to sales data, and the second data format corresponds to distribution data,

20 the first entity comprises a consumer level entity, and the second entity comprises a distribution level entity,
the normalized format comprises at least time normalized data,
the plan for the item comprises a time range,
the first address identifier comprises a site identifier,
the site identifier comprises at least one of an account number an account type, a site type, a site group, a corresponding IP address, a network identifier, and a URL.

11. A computer program product embodied in a non-transitory computer readable medium, the computer readable medium having stored thereon a sequence of instructions which, when executed by a processor causes the processor to execute a process, the process comprising:
  identifying a series of records stored on a computer-readable medium, a first subset of the series of records being from a first plurality of sources, and a second subset of the series of records being from a second plurality of sources;
  identifying, from the first subset of the series of records, a first source of data in a first data format, the first data format comprising at least an item identifier and a first date range, the first subset of the series of records having first address identifiers associated with the data in the first data format, the first address identifiers comprising at least one of an IP address, a network identifier, or a uniform resource locator, one more individual records of the data recorded in the first data format using a selected first application programming interface of a first plurality of application programming interfaces, the first application programming interface selected based on an origin of the at least some of the data in the first data format, wherein different application programming interfaces of the first plurality of application programming interfaces are used for processing different formats of the first subset of the series of records from the first plurality of sources;
  identifying, from the second subset of the series of records, a second source of data in a second data format, the second data format comprising at least the item identifier and a second date range, the second subset of the series of records having second address identifiers associated with the data in the second data format, the second address identifiers comprising at least one of an IP address, a network identifier, or a uniform resource locator, one more individual records of the data recorded in the second data format using a selected second application programming interface of a second plurality of application programming interfaces, the second application programming interface selected based on an origin of the at least some of the data in the second data format, wherein different application programming interfaces of the second plurality of application programming interfaces are used for processing different formats of the second subset of the series of records from the second plurality of sources, wherein the first date range in the first data format is different from the second date range in the second data format;
  converting records from both the first source of data in the first data format and the second source of data in the second data format into a normalized format;
  combining at least a portion of the records from the first source of data in the normalized format with at least a different portion of the records from the second source of data in the normalized format to generate combined data for an item;
implementing a first user interface and a second user interface that is different than the first user interface, wherein the first user interface comprises a screen widget having a selector menu for selecting different modifications of data that is displayed on the second user interface, the second user interface displaying a database table comprising:
(i) a first column that identifies a selected modification to the item;
(ii) a second column that holds results from a specific modification of the data that are derived from one or more additional parameters corresponding to the item based on the selected modification from the selector menu in the screen widget, wherein the selected modification is identified in the first column of the second user interface;
(iii) a one or more additional columns that hold the one or more additional parameters corresponding to the selected modification identified in the first column; and
(iv) a plurality of database table rows, each row from the plurality of database table rows corresponding to a different item;
receiving a selection of a modification of data in the first column of the second user interface through the selector menu from the screen widget on the first user interface; and
generating the data corresponding to the item in the second column of the database table within the second user interface based at least on the combined data for the item, the selected modification that was received from the first user interface, and the one or more additional parameters in the one or more additional columns of the second user interface.

12. The computer program product of claim 11, further comprising:
transmitting a plan for the item to at least one originator of the second source of data;
determining a data origin using a first address identifier;
maintaining a repository of at least one model parameter; and
wherein:
the first source of data in a first data format is received from a first entity and the second source of data in a second data format is received from a second entity, the first entity is different from the second entity, the first data corresponds to sales data, and the second data format corresponds to distribution data,
the first entity comprises a consumer level entity, and the second entity comprises a distribution level entity,
the normalized format comprises at least time normalized data,
the plan for the item comprises a time range,
the first address identifier comprises a site identifier,
the site identifier comprises at least one of an account number an account type, a site type, a site group, a corresponding IP address, a network identifier, and a URL.

13. The computer program product of claim 11, further comprising determining a data origin using a first address identifier.

14. The computer program product of claim 11, further comprising maintaining a repository of at least one model parameter.

15. The computer program product of claim 11, wherein the additional parameters correspond to at least one of a confidence interval, a standard error value, or an optional override.

16. The computer program product of claim 11, wherein the first source of data in a first data format is received from a first entity and the second source of data in a second data format is received from a second entity.

17. The computer program product of claim 16, wherein the first entity is different from the second entity.

18. A system comprising:
a processor;
a storage subsystem comprising at least one database component having a series of records stored on a computer-readable medium, a first subset of the series of records being from a first plurality of sources, and a second subset of the series of records being from a second plurality of sources;
a memory for holding programmable code, wherein the programmable code includes instructions executable by the processor to implement:
a first incoming data processing module identifying, from the first subset of the series of records, a first source of data in a first data format, the first data format comprising an item identifier and a first date or first date range, the first subset of the series of records having first address identifiers associated with the data in the first data format, the first address identifiers comprising at least one of an IP address, a network identifier, or a uniform resource locator, one more individual records of the data recorded in the first data format using a selected first application programming interface of a first plurality of application programming interfaces, the first application programming interface selected based on an origin of the at least some of the data in the first data format, wherein different application programming interfaces of the first plurality of application programming interfaces are used for processing different formats of the first subset of the series of records from the first plurality of sources;
a second incoming data processing module identifying, from the second subset of the series of records, a second source of data in a second data format, the second data format comprising at least the item identifier and a second date or second date range, the second subset of the series of records having second address identifiers associated with the data in the second data format, the second address identifiers comprising at least one of an IP address, a network identifier, or a uniform resource locator, one more individual records of the data recorded in the second data format using a selected second application programming interface of a second plurality of application programming interfaces, the second application programming interface selected based on an origin of the at least some of the data in the second data format, wherein different application programming interfaces of the second plurality of application programming interfaces are used for processing different formats of the second subset of the series of records from the second plurality of sources, wherein the first date range in the first data format is different from the second date range in the second data format; and a replenishment plan generator combining at least a portion of the first subset of the series of records from the first source of data with at least a portion of the second subset of the series of records from the second source of data to generate a replenishment plan for an item by:

converting records from both the first source of data in the first data format and the second source of data in the second data format into a normalized format;

combining at least a portion of the records from the first source of data in the normalized format with at least a different portion of the records from the second source of data in the normalized format to generate combined data for an item;

implementing a first user interface and a second user interface that is different than the first user interface, wherein the first user interface comprises a screen widget having a selector menu for selecting different modifications of data that is displayed on the second user interface, the second user interface displaying a database table comprising:

(i) a first column that identifies a selected modification to the item;

(ii) a second column that holds results from a specific modification of the data that are derived from one or more additional parameters corresponding to the item based on the selected modification from the selector menu in the screen widget, wherein the selected modification is identified in the first column of the second user interface;

(iii) a one or more additional columns that hold the one or more additional parameters corresponding to the selected modification identified in the first column; and (iv) a plurality of database table rows, each row from the plurality of database table rows corresponding to a different item;

receiving a selection of a modification of data in the first column of the second user interface through the selector menu from the screen widget on the first user interface; and generating the data corresponding to the item in the second column of the database table within the second user interface based at least on the combined data for the item, the selected modification that was received from the first user interface, and the one or more additional parameters in the one or more additional columns of the second user interface.

19. The system of claim 18, wherein the first source of data in a first data format is received from a first entity and the second source of data in a second data format is received from a second entity.

20. The system of claim 18, wherein the programmable code includes additional instructions executable by the processor to implement:

transmitting a plan for the item to at least one originator of the second source of data;

determining a data origin using a first address identifier;

maintaining a repository of at least one model parameter; and wherein:

the first source of data in a first data format is received from a first entity and the second source of data in a second data format is received from a second entity, the first entity is different from the second entity, the first data corresponds to sales data, and the second data format corresponds to distribution data, the first entity comprises a consumer level entity, and the second entity comprises a distribution level entity, the normalized format comprises at least time normalized data, the plan for the item comprises a time range, the first address identifier comprises a site identifier, the site identifier comprises at least one of an account number an account type, a site type, a site group, a corresponding IP address, a network identifier, and a URL.

* * * * *

UNITED STATES PATENT AND TRADEMARK OFFICE
CERTIFICATE OF CORRECTION

PATENT NO. : 10,181,107 B2
APPLICATION NO. : 14/314442
DATED : January 15, 2019
INVENTOR(S) : Gopinath et al.

It is certified that error appears in the above-identified patent and that said Letters Patent is hereby corrected as shown below:

In the Specification

In Column 1, Line 67, delete "and or" and insert -- and/or --, therefor.

In Column 4, Line 27, delete "plan," and insert -- plan. --, therefor.

In Column 5, Line 22, delete "and or" and insert -- and/or --, therefor.

In Column 5, Line 34, delete "and or" and insert -- and/or --, therefor.

In Column 7, Line 38, delete "and or" and insert -- and/or --, therefor.

In Column 7, Line 62, delete "1B 100" and insert -- 1B100 --, therefor.

Signed and Sealed this
Seventh Day of January, 2020

Andrei Iancu
*Director of the United States Patent and Trademark Office*